United States Patent [19]
Ramesh

[11] Patent No.: US 6,205,127 B1
[45] Date of Patent: Mar. 20, 2001

(54) WIRELESS TELECOMMUNICATIONS SYSTEM THAT MITIGATES THE EFFECT OF MULTIPATH FADING

(75) Inventor: Nallepilli Subramanian Ramesh, New Providence, NJ (US)

(73) Assignee: Lucent Technologies, Inc., Murray Hill, NJ (US)

( * ) Notice: Subject to any disclaimer, the term of this patent is extended or adjusted under 35 U.S.C. 154(b) by 0 days.

(21) Appl. No.: 09/063,690

(22) Filed: Apr. 21, 1998

(51) Int. Cl.[7] ................................................. H04Q 11/04
(52) U.S. Cl. .......................... 370/329; 370/330; 370/335; 370/336; 370/342; 370/343
(58) Field of Search .................................... 375/308, 279, 375/264, 351, 206, 347, 141, 142; 370/328, 335, 336, 338, 342, 330, 348, 329, 343; 455/277.1, 52.3, 276.1

(56) References Cited

U.S. PATENT DOCUMENTS

| | | | |
|---|---|---|---|
| 5,260,968 | * 11/1993 | Gadner et al. | 375/1 |
| 5,280,472 | * 1/1994 | Gilhousen et al. | 370/18 |
| 5,375,140 | * 12/1994 | Bustamante et al. | 375/1 |
| 5,400,359 | * 3/1995 | Hikoso et al. | 375/1 |
| 5,513,176 | * 4/1996 | Dean et al. | 370/18 |
| 5,602,834 | * 2/1997 | Dean et al. | 370/335 |
| 5,615,227 | * 3/1997 | Schumacher, Jr. et al. | 375/206 |
| 5,663,990 | * 9/1997 | Bolgiano et al. | 375/347 |
| 5,859,879 | * 1/1999 | Bolgiano et al. | 375/347 |
| 6,085,076 | * 7/2000 | Lindsay et al. | 455/277.1 |

* cited by examiner

*Primary Examiner*—Dang Ton
*Assistant Examiner*—Anthony Ton
(74) *Attorney, Agent, or Firm*—DeMont & Breyer, LLC; Jason Paul DeMont; Wayne S. Breyer

(57) ABSTRACT

A wireless telecommunications system is disclosed that mitigates multipath fading through an improvement in transmit diversity. Furthermore, embodiments of the present invention are well-suited for use with all forward channel multiplexing schemes (e.g., frequency-division multiplexing, time-division multiplexing, code-division multiplexing, etc.) and all modulation techniques (e.g., amplitude modulation, frequency modulation, phase modulation, etc.). An illustrative embodiment of the present invention comprises: a signal inverter for inverting and alternately not-inverting a first signal in accordance with a schedule to create a second signal; a first antenna for transmitting the first signal; and a second antenna for transmitting the second signal.

40 Claims, 17 Drawing Sheets

100

WIRELESS TELECOMMUNICATIONS SYSTEM THAT MITIGATES THE EFFECT OF MULTIPATH FADING

FIELD OF THE INVENTION

The present invention relates to telecommunications in general, and, more particularly, to a wireless telecommunications system that employs an improvement in transmit diversity to mitigate the effect of multipath fading.

BACKGROUND OF THE INVENTION

FIG. 1 depicts a schematic diagram of a portion of a wireless telecommunications system in the prior art, which system provides wireless telecommunications service to a number of wireless terminals (e.g., wireless terminals 101-1 through 101-3) that are situated within a geographic region. The heart of a wireless telecommunications system is a wireless switching center ("WSC"), which also may be known as a mobile switching center or mobile telephone switching office. Typically, a wireless switching center (e.g., WSC 120) is connected to a plurality of base stations (e.g., base stations 103-1 through 103-5) that are dispersed throughout the geographic region serviced by the system and to the local and long-distance telephone and data networks (e.g., local-office 130, local-office 138 and toll-office 140). A wireless switching center is responsible for, among other things, establishing and maintaining a call between a first wireless terminal and a second wireless terminal or, alternatively, between a wireless terminal and a wireline terminal (e.g., wireline terminal 150), which is connected to the system via the local and/or long-distance networks.

The geographic region serviced by a wireless telecommunications system is partitioned into a number of spatially distinct areas called "cells." As depicted in FIG. 1, each cell is schematically represented by a hexagon. In practice, however, each cell has an irregular shape that depends on the topography of the terrain surrounding the cell. Typically, each cell contains a base station, which comprises the radios and antennas that the base station uses to communicate with the wireless terminals in that cell and also comprises the transmission equipment that the base station uses to communicate with the wireless switching center.

For example, when a user of wireless terminal 101-1 desires to transmit information to a user of wireless terminal 101-2, wireless terminal 101-1 transmits a data message bearing the user's information to base station 103-1. The data message is then relayed by base station 103-1 to wireless switching center 120 via wireline 102-1. Because wireless terminal 101-2 is in the cell serviced by base station 103-1, wireless switching center 120 returns the data message back to base station 103-1, which relays it to wireless terminal 101-2.

In a terrestrial wireless telecommunications system, in contrast to a satellite-based system, an empirical phenomenon known as multipath fading affects the ability of a base station and a wireless terminal to communicate. The cause of multipath fading and the factors that affect its severity are described below.

FIG. 2 depicts an illustration that aids in understanding the cause of multipath fading. When a base station transmits a signal to a wireless terminal with either a directional or an omni-directional antenna at least some images of the signal radiate in a direction other than directly at the wireless terminal. The result is that: (1)one image of the signal may be received by the wireless terminal in a direct, line-of-sight path, provided that one exists (e.g., image 202-3), (2)other images of the signal pass the wireless terminal and are never received (e.g., images 202-2 and 202-4), and (3)other images of the signal strike an object, such as a building, and are reflected or refracted towards the wireless terminal (e.g., images 202-1 and 202-5). The result is that an image of a transmitted signal can be received by a wireless terminal via a direct path and one or more indirect paths.

Furthermore, the signal quality (as measured by, for example, the signal-to-noise ratio, average power, absolute power, frame-error rate, bit-error rate, etc.) of each image varies as a function of the length of the path, whether the signal is reflected off or refracted through an object, the angle at which the signal is incident to the object, and the geometric and physical properties of the object.

Because each image travels at the same speed (i.e., the speed of light) over a different length path, each image arrives at the wireless terminal at a different time. This causes the various images to arrive out of phase with respect to each other, and thus, to interfere. When the interference is destructive, in contrast to constructive, the interference greatly hinders the ability of a wireless terminal to generate an acceptable estimate of the transmitted signal. The phenomenon of destructive interference by multiple phase-shifted images of a single transmitted signal is known as multipath fading.

The severity of multipath fading at a receive antenna is a function of three factors: (1)the location of the transmitting antenna with respect to the objects in the environment that reflect and refract the transmitted signal, (2)the location of the receive antenna with respect to the same objects, and (3)the wavelength of the transmitted signal. Because these factors are spatial in nature, multipath fading is a localized phenomenon. In other words, multipath fading occurs in isolated pockets called "fades" that are geographically dispersed. As an analogy, fades are isolated and dispersed throughout a geographic region like the holes are isolated and dispersed in Swiss cheese. Typically, the mean diameter of a fade equals one wavelength of the transmitted signal.

There are two techniques in the prior art for mitigating the effect of multipath fading and both are derived from an understanding that the phenomenon is localized in nature. The first technique, receive diversity, will be discussed first, and then the second technique, transmit diversity, will be discussed.

In accordance with receive diversity, a radio receiver employs two receive antennas that are positioned far from each other to receive a signal that is transmitted from only one antenna. Typically, the two receive antennas are positioned more than several wavelengths of the transmitted signal from each other. Because multipath fades are isolated and dispersed like the holes in Swiss cheese, roughly circular in shape and about one wavelength of the transmitted signal in diameter, it is unlikely that both receive antennas will be in a fade at the same time. In other words, if one antenna is in a fade, then it is unlikely that the other is also in a fade. Therefore, the radio receiver can operate with the confidence that the transmitted signal will be received with satisfactory quality at one of the receive antennas.

FIG. 3 depicts a block diagram that illustrates how receive diversity can be implemented in the wireless telecommunications system of FIG. 1. In FIG. 3, base station 103-1 transmits a signal via one transmit antenna, Tx, to wireless terminal 101-1, which has two receive antennas $Rx_1$ and $Rx_2$ that are separated by several wavelengths of the transmitted signal. Although the arrangement in FIG. 3 mitigates the effect of multipath fading, it is generally impractical to mount two antennas on a wireless terminal when the antennas need to be more than a few inches apart. Furthermore, the need for two antennas on a wireless terminal greatly increases its cost. It is for these reasons that receive diversity is rarely implemented in wireless terminals.

Transmit diversity is a corollary of receive diversity. In accordance with transmit diversity, a radio transmitter employs two transmit antennas that are positioned far from each other to transmit one signal. The radio receiver only has one antenna. Typically, the two transmit antennas are positioned more than several wavelengths of the transmitted signal from each other. The radio transmitter outputs the signal of interest via one antenna in real-time, and delays an exact copy of the same signal before outputting it via the second antenna. Because the location of a multipath fade is dependent on the location of the transmitting antenna, each transmit antenna causes fades to occur in different places. Therefore, if a receive antenna is in a fade caused by the signal from one transmit antenna, it is likely that the receive antenna will be able to receive the signal from the other transmit antenna with satisfactory quality. In other words, it is unlikely that both transmit antennas will cause fades in the same place, and therefore, the radio receiver is likely to be able to receive the signal from at least one of the transmit antennas at any given location.

FIG. 4 depicts a block diagram that illustrates how transmit diversity can be implemented in the wireless telecommunications system of FIG. 1. In FIG. 4, base station 103-1 transmits a signal via one transmit antenna, $T_{x1}$, in real-time, and delays an exact copy of the same signal before outputting it via a second antenna, $T_{x2}$. Transmit diversity in the prior art is disadvantageous, however, because it creates, on average, twice as many images of the transmitted signal at the receiver than without transmit diversity. This requires that the wireless terminal be capable of distinguishing the two time shifted images, which significantly increases the complexity of the wireless terminal and also its cost.

Therefore, the need exists for a technique for mitigating the effect of multipath fading without some of the costs and disadvantages associated with the prior art.

SUMMARY OF THE INVENTION

The present invention is a wireless telecommunications system that mitigates the effect of multipath fading without some of the costs and disadvantages associated with techniques in the prior art. In particular, the present invention is an improvement in transmit diversity using a signal inverter to alternately invert and not invert a copy of a signal resulting in the mitigation of multipath fading. The improvement is inexpensive, has similar performance characteristics to traditional transmit diversity, and often requires no change to the design of a wireless terminal. In those cases in which a change to the wireless terminal is advantageous or necessary, the change typically adds little or nothing to the cost of the wireless terminal.

An illustrative embodiment of the present invention comprises: a first antenna for transmitting a first signal, a second antenna for transmitting a second signal, and a signal inverter for generating the second signal based on inverting and alternately not-inverting the first signal in accordance with a schedule. The purpose of the schedule is to establish the rate at which a wireless terminal appears to enter and exit fades regardless of the rate at which the wireless terminal is moving relative to the transmitting antennas. The significance of different rates is discussed later is this summary and in the detailed description.

By transmitting the first signal via the first antenna and the second signal via the second antenna, the two signals interfere in two alternating patterns. When the two antennas are separated by a distance equal to at least several wavelengths of the carrier of the transmitted signal, then the two patterns will differ in that they are unlikely to both create a multipath fade in the same location. In other words, one pattern may create one set of fades in one set of locations, and the other pattern may create another set of fades in another set of locations, but it is unlikely that both patterns will create a fade in the same location. Therefore, if a wireless terminal is in a fade during one of the two patterns, then it is unlikely to be in a fade during the other pattern. This fact, combined with the next, enables embodiments of the present invention to mitigate the effect of multipath fading.

The effect of multipath fading on a wireless terminal is related to the continuous amount of time that a wireless terminal is in a fade. When a wireless terminal spends a long time in a fade (e.g., one second), the wireless terminal may fail to receive so many consecutive bits that the wireless terminal is unable to create an acceptable estimate of the transmitted signal, even when an error detection and correction mechanism is employed. In contrast, when a wireless terminal spends a short time in a fade (e.g., 50 milliseconds), the wireless terminal may be capable of creating an acceptable estimate of the transmitted signal because a typical error detection and correction mechanism will overcome the shorter duration fades. Therefore, the effect of multipath fading can be mitigated if the length of time that a wireless terminal spends in a fade can be reduced.

One way to reduce the length of time that a wireless terminal spends in fade is to physically move the wireless terminal, as if it were in a moving automobile, to avoid its lingering in a fade. This is not, however, always practical—especially for wireless terminals that are stationary or moving slowly (e.g., walking, etc.).

Motion is relative, however, and rather than attempting to physically move the wireless terminal, the present invention endeavors to move the fades instead and, thus, to create the effect of physically moving the wireless terminal. Thus, by inverting and alternately not inverting the input signal, the present invention moves the fades and thus prevents a wireless terminal from lingering in a fade.

Furthermore, by controlling the rate at which the input signal is inverted and alternately not inverted, the present invention is capable of limiting the length of time that a wireless terminal spends in a fade. If the rate of inverting and alternately not inverting the input signal is high, then the amount of continuous time that a wireless terminal spends in a fade is low and the error detection and correction mechanism can overcome the effect of the short duration fade.

Therefore, the maximum continuous amount of time that a wireless terminal can spend in a fade without being adversely affected by a fade is determined by the quality of the error correction used on the forward channel. The rate at which the input signal is inverted and alternately not inverted determines the maximum amount of time that a wireless terminal will spend in a fade, and the schedule directs the rate at which the input signal is inverted and alternately not inverted.

In summary, embodiments of the present invention mitigate the effect of multipath fading by moving the fades, and, therefore, reducing the length of time that a wireless terminal spends in a fade.

DETAILED DESCRIPTION

Road Map to the Detailed Description

Figure 1:
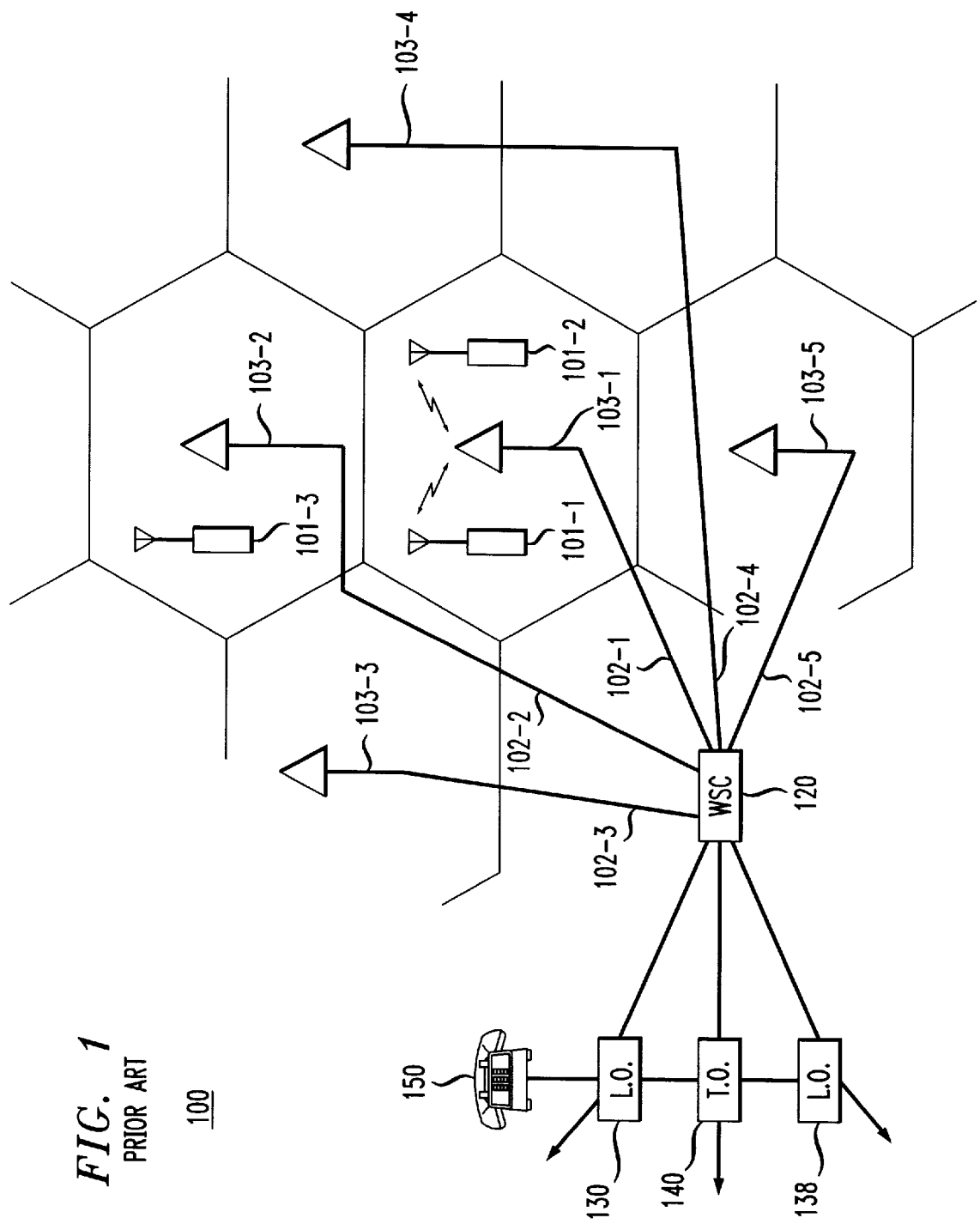
FIG. 1 depicts a schematic diagram of a wireless telecommunications system in the prior art.
Figure 2:
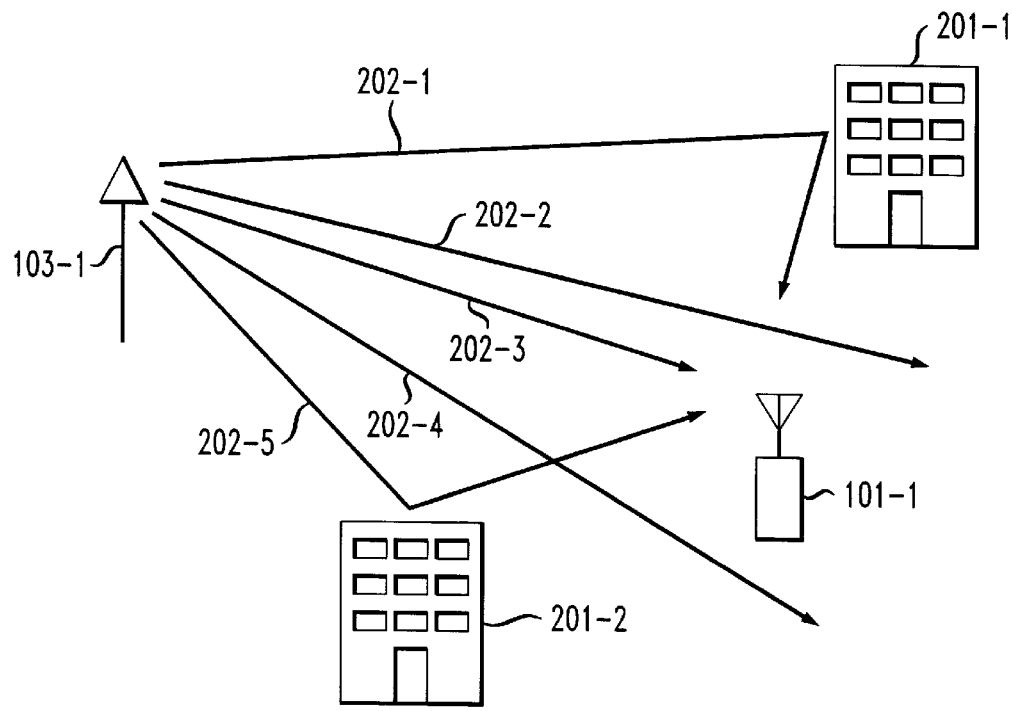
FIG. 2 depicts an illustration of a base station that is transmitting to a wireless terminal.
Figure 3:
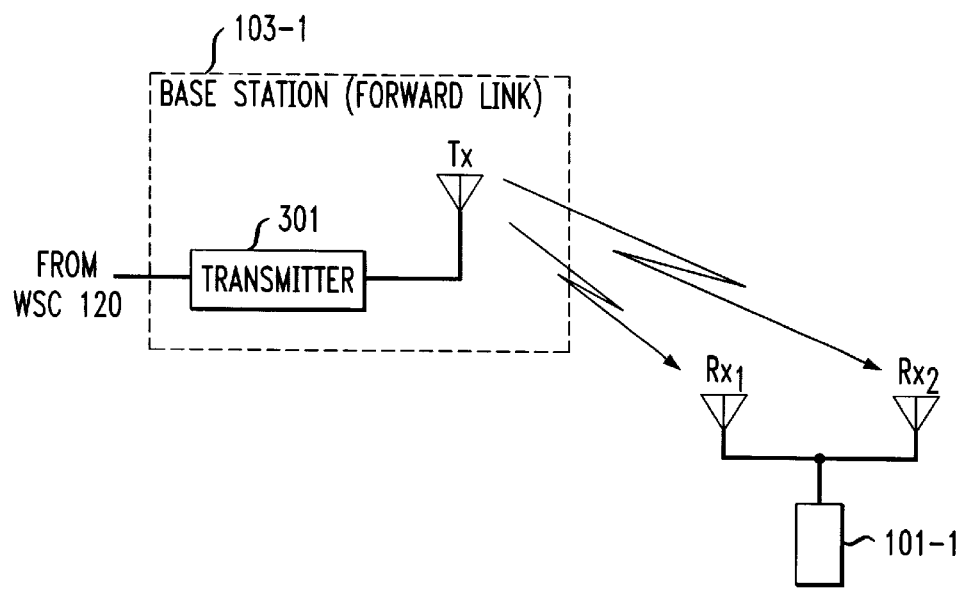
FIG. 3 depicts a block diagram of a wireless terminal that employs receive diversity.
Figure 4:
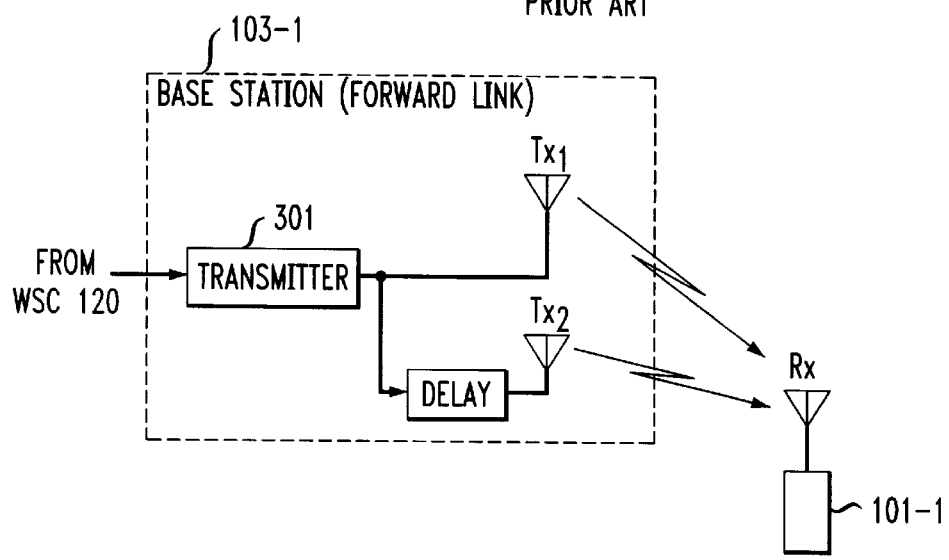
FIG. 4 depicts a block diagram of a base station that employs transmit diversity.
Figure 5:
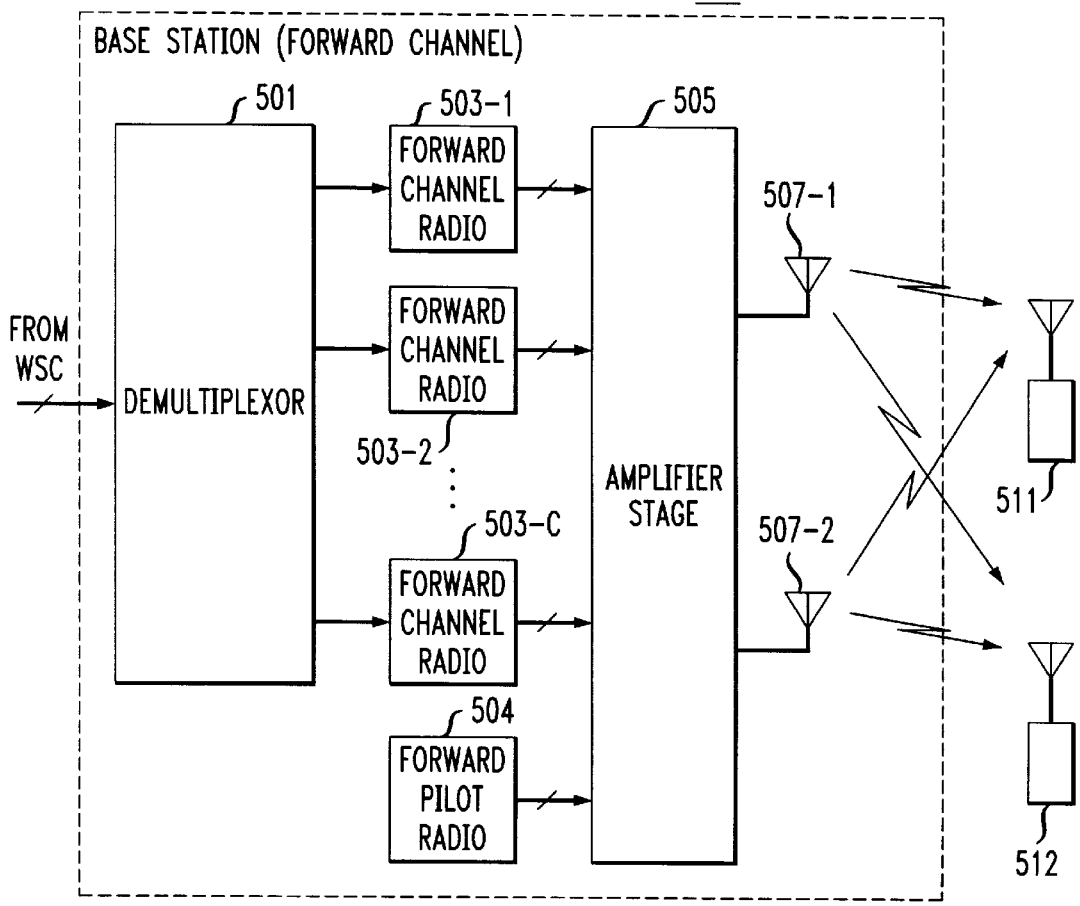
FIG. 5 depicts a block diagram of a base station in accordance with an illustrative embodiment of the present invention.
Figure 6:
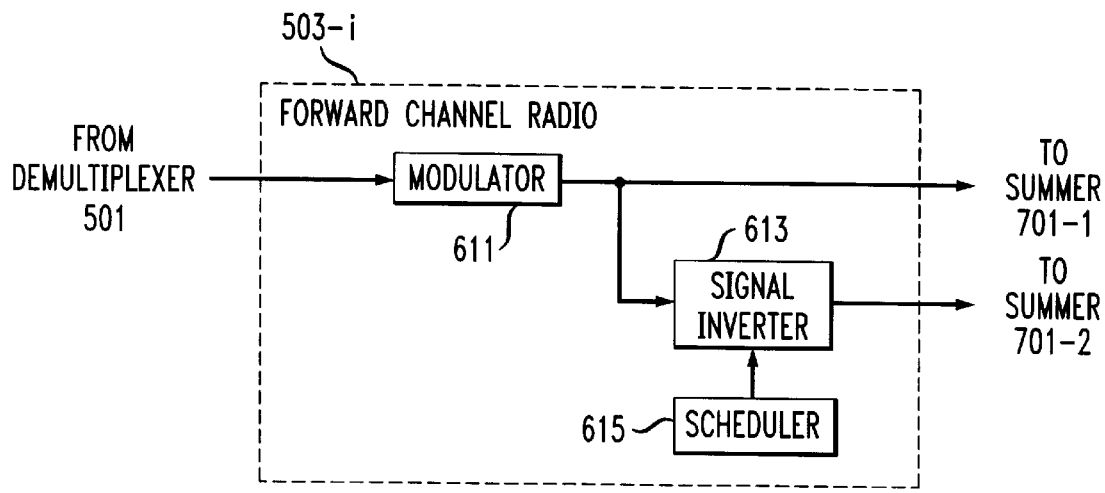
FIG. 6 depicts a block diagram of a forward channel radio in accordance with an illustrative embodiment of the present invention.

The detailed description teaches several embodiments of the present invention, and, therefore, a brief road map will facilitate an understanding of the various embodiments and their interrelationship. FIG. 5 depicts a block diagram of a base station that supports all forward channel multiplexing schemes (e.g., frequency-division multiplexing, time-division multiplexing, code-division multiplexing, etc.) and all modulation techniques (e.g., amplitude modulation, frequency modulation, phase modulation, etc.) in accordance with the present invention. FIG. 6 depicts a block diagram of a forward channel radio for use within the base station of FIG. 5 that supports any forward channel multiplexing scheme and any modulation technique, in accordance with the present invention.

Figure 10:
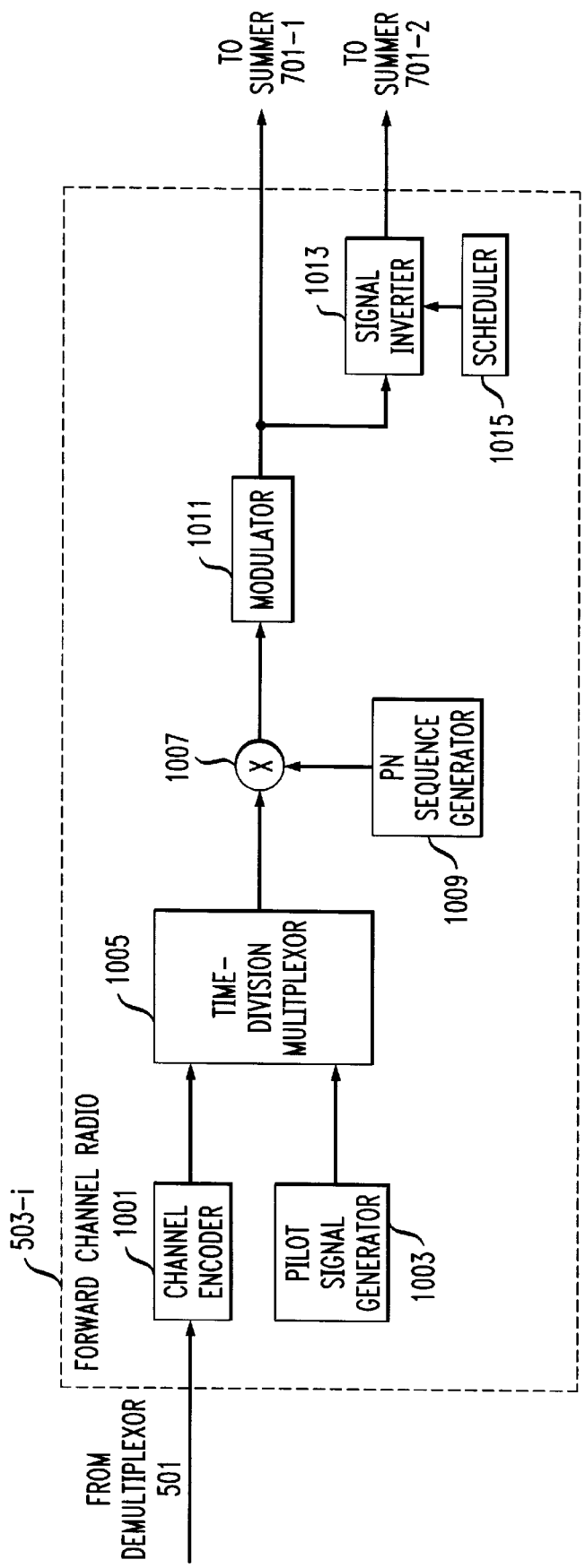
FIG. 10 depicts a block diagram of a forward channel radio in accordance with an illustrative embodiment of the present invention that transmits an information-bearing signal that is time-division multiplexed with a pilot signal.
Figure 13:
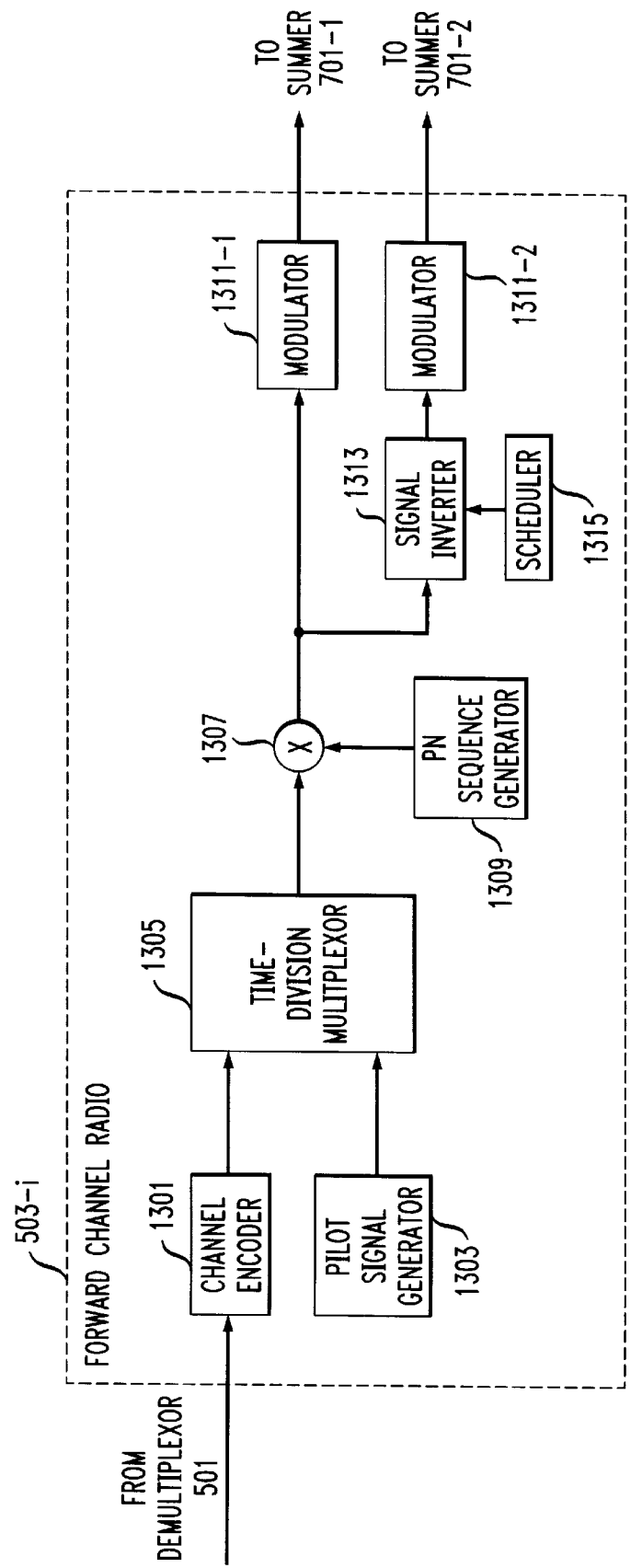
FIG. 13 depicts a block diagram of another forward channel radio in accordance with an illustrative embodiment of the present invention that transmits an information-bearing signal that is time-division multiplexed with a pilot signal.
Figure 14:
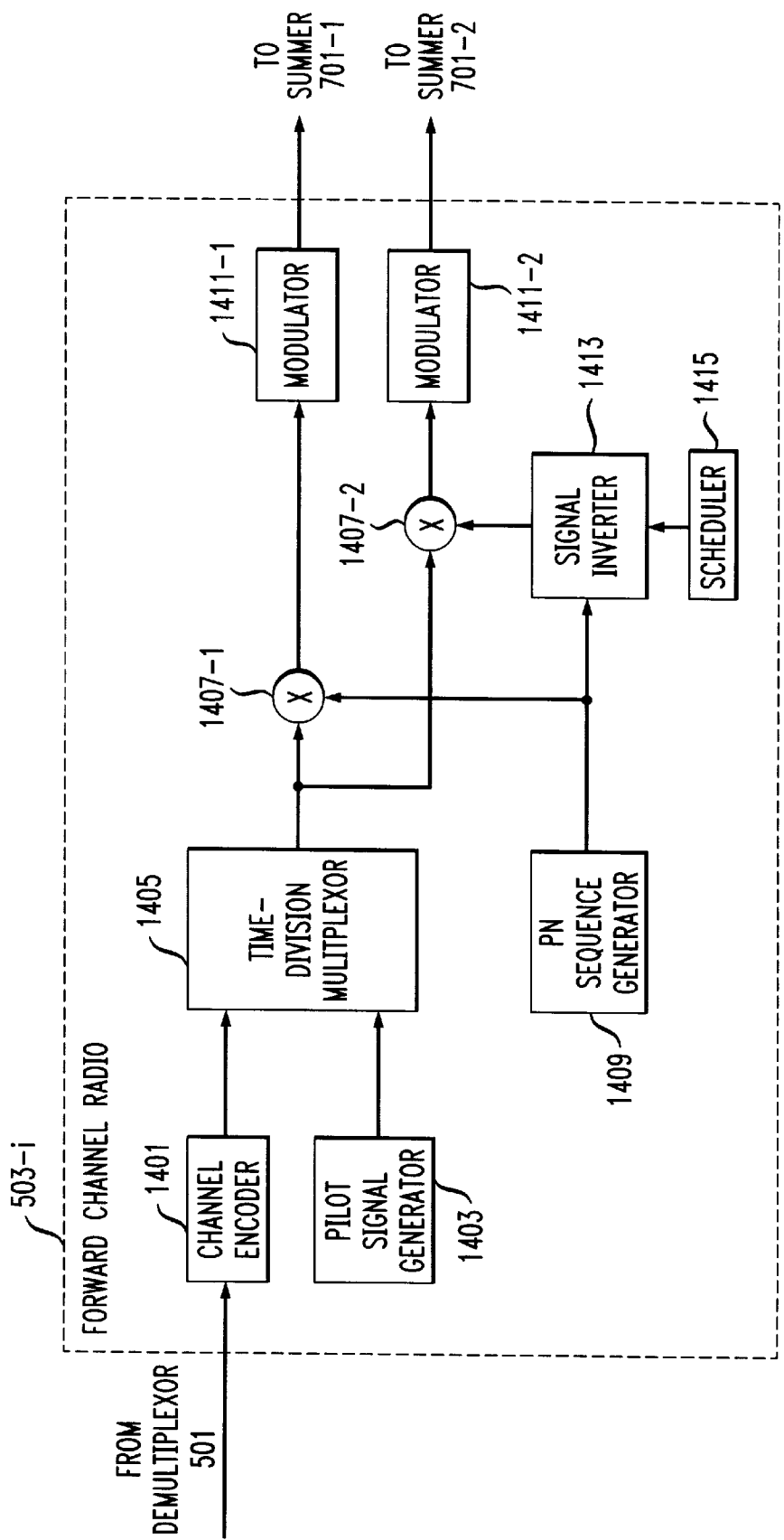
FIG. 14 depicts a block diagram of yet another forward channel radio in accordance with an illustrative embodiment of the present invention that transmits an information-bearing signal that is time-division multiplexed with a pilot signal.
Figure 15:
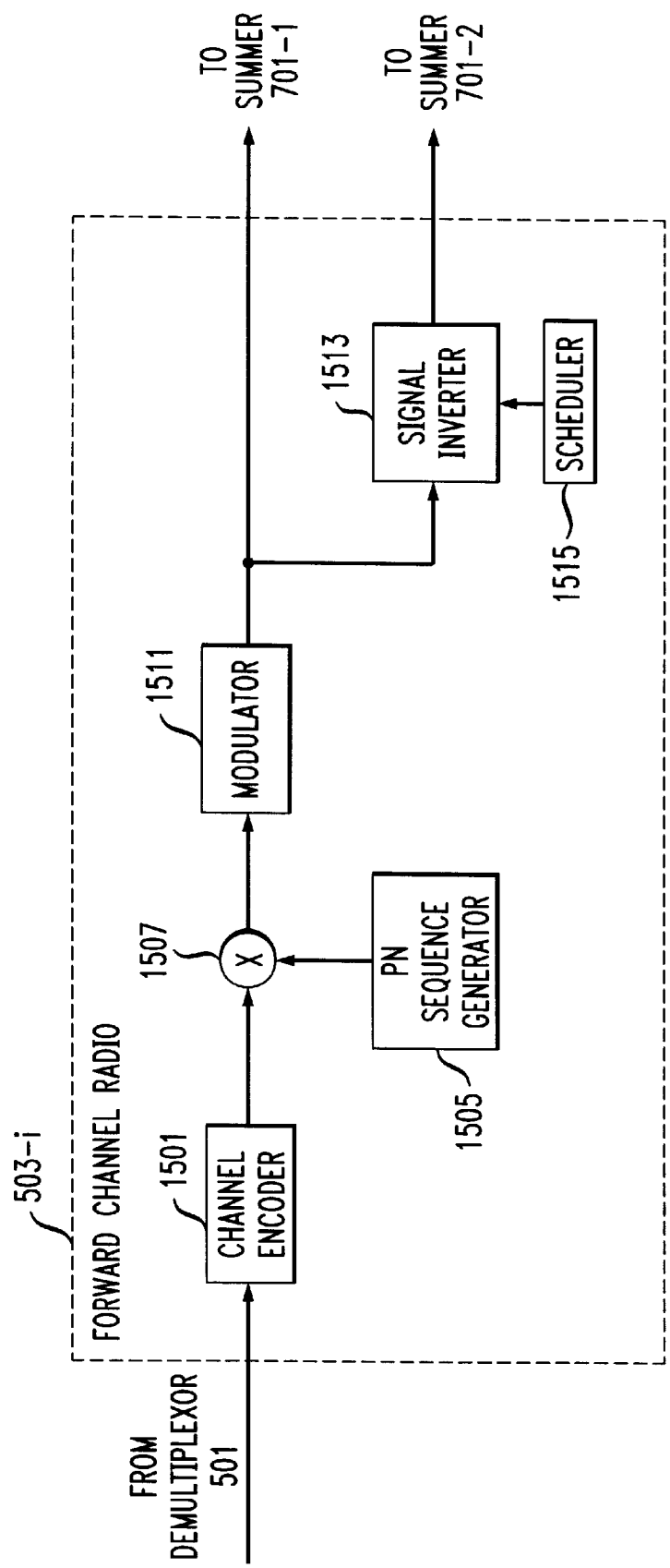
FIG. 15 depicts a block diagram of a forward channel radio in accordance with an illustrative embodiment of the present invention that transmits an information-bearing signal that is code-division multiplexed with a pilot signal.
Figure 16:
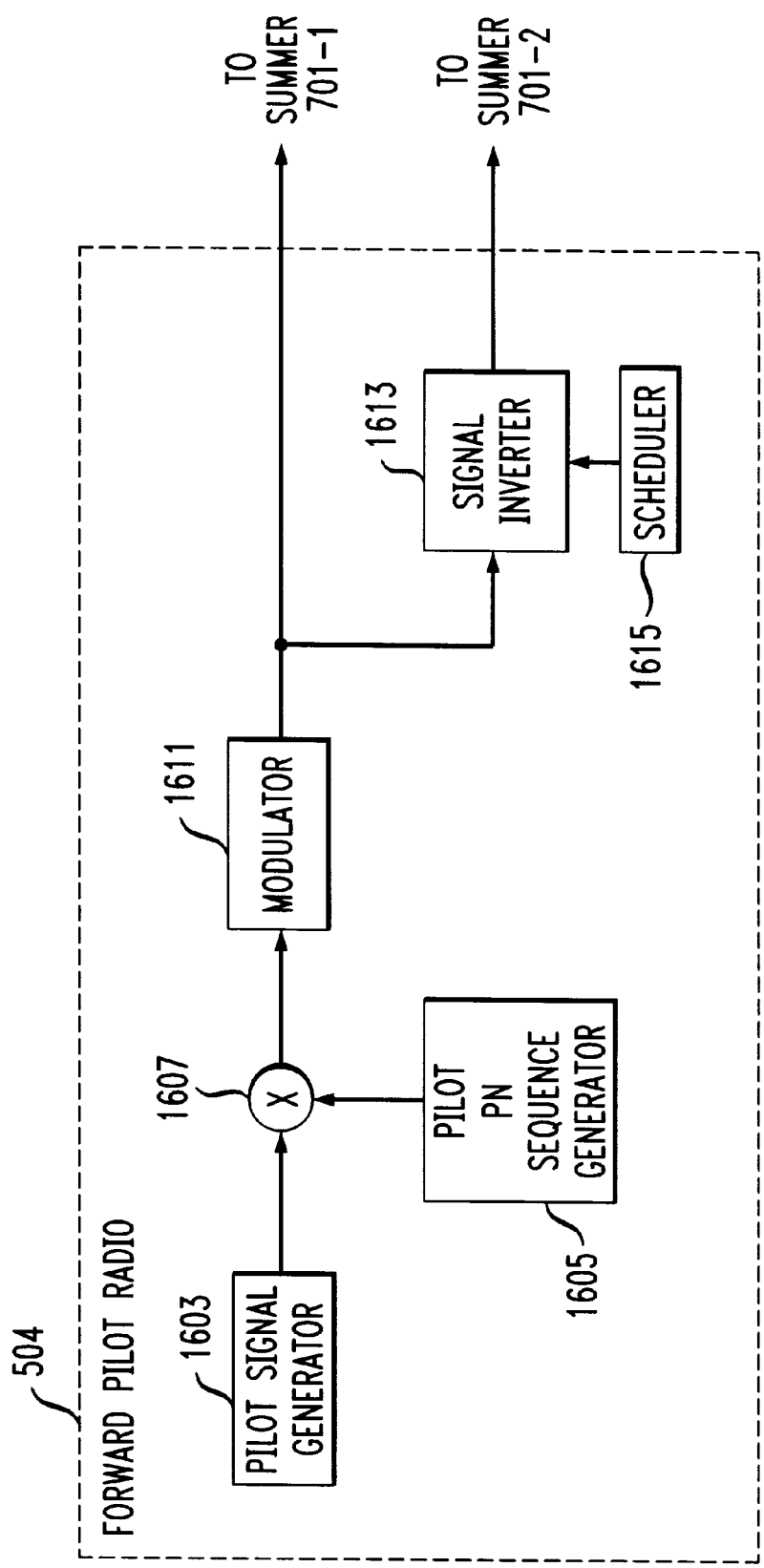
FIG. 16 depicts a block diagram of a pilot forward channel radio in accordance with an illustrative embodiment of the present invention that transmits a pilot signal that is code-division multiplexed with one or more information-bearing signals.

Because some telecommunications systems transmit a pilot signal in addition to an information-bearing signal, FIGS. 10 and 13 through 16 depict block diagrams forward channel radios that multiplex the pilot signal with the information-bearing signal, in accordance with the present invention. FIGS. 10, 13 and 14 depict block diagrams of forward channel radios that time-division multiplex a pilot signal and an information-bearing signal into a single code-division multiplexed channel. In contrast, FIGS. 15 and 16 depict block diagrams of forward channel radios that code-division multiplex a pilot signal and an information-bearing signal into a single frequency-delimited channel.

Some wireless terminal designs in the prior art are fully capable of receiving and processing a signal from a forward channel radio in accordance with the present invention. Other wireless terminal designs are, however, advantageously modified to take full advantage of the present invention. Therefore, FIGS. 17 through 19 and 21–22 depict block diagrams of wireless terminals that are particularly well-suited for receiving and processing a signal from a forward channel radio in accordance with the present invention.

Figure 17:
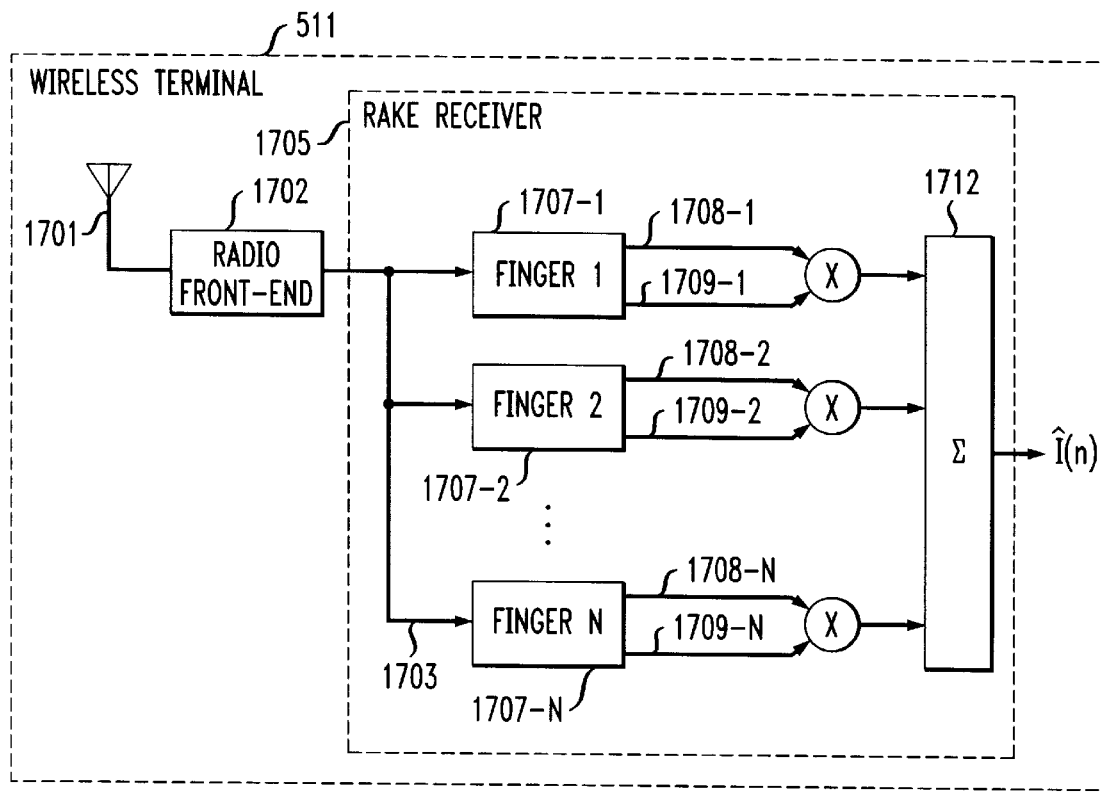
FIG. 17 depicts a block diagram of a wireless terminal in accordance with an illustrative embodiment of the present invention.
Figure 18:
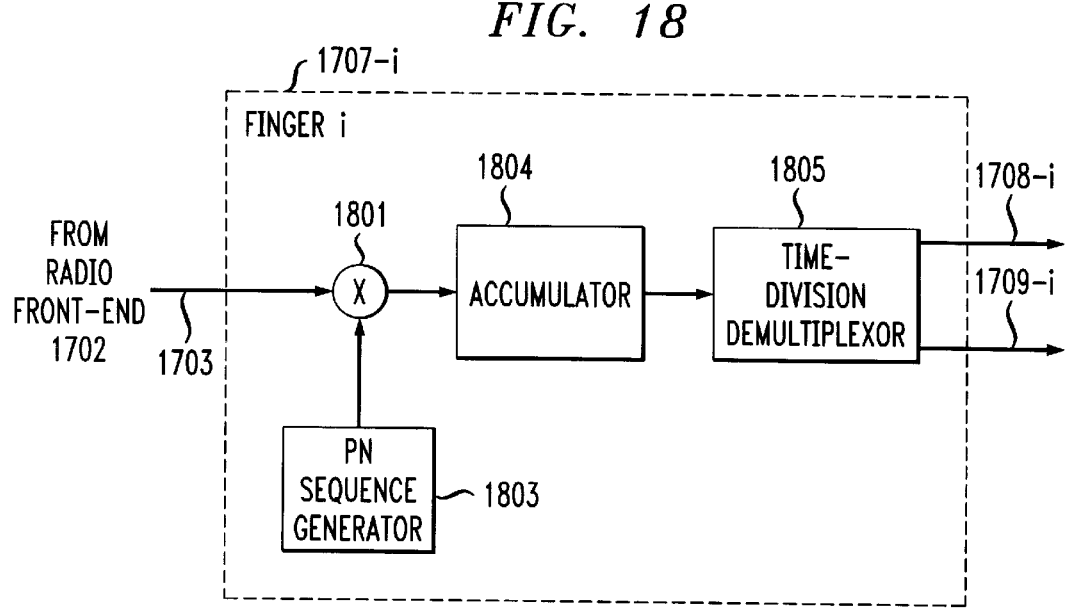
FIG. 18 depicts a block diagram of a finger in the wireless terminal in FIG. 17 that is capable of receiving an information-bearing signal that is time-division multiplexed with a pilot signal, in accordance with the illustrative embodiment of the present invention.
Figure 19:
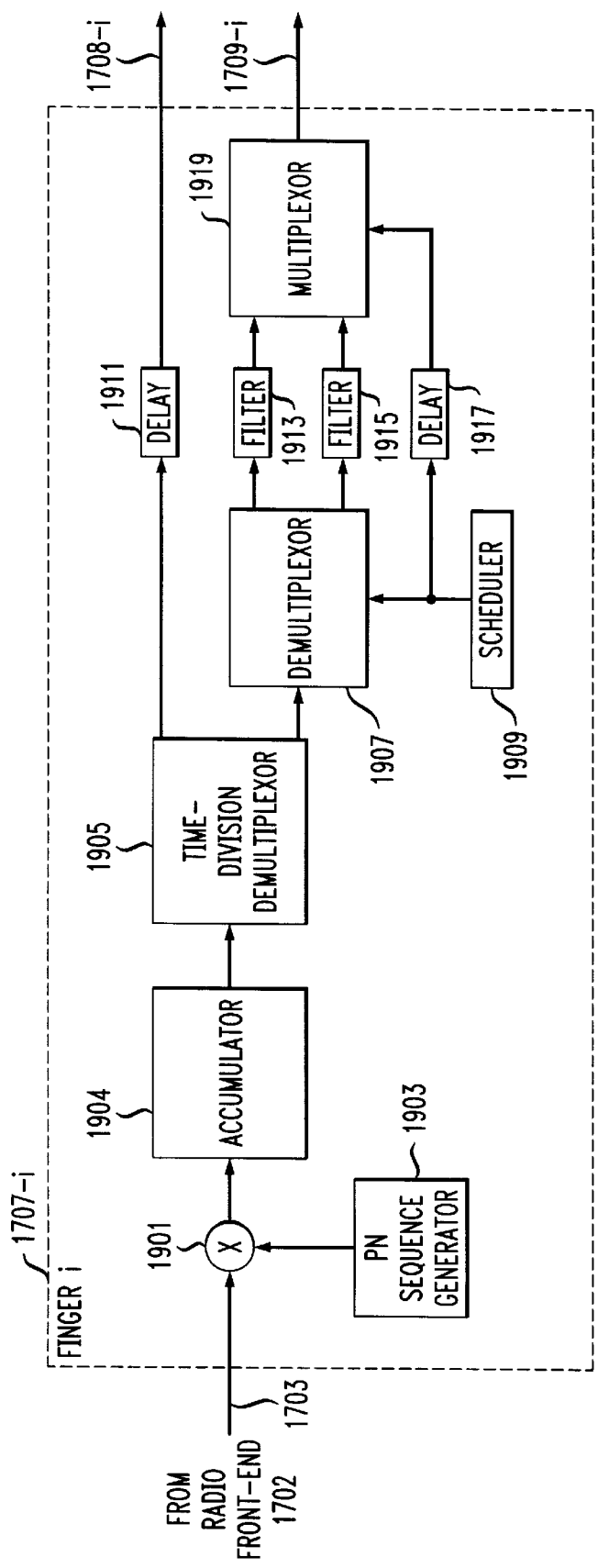
FIG. 19 depicts a block diagram of another finger in the wireless terminal in FIG. 17 that is capable of receiving an information-bearing signal that is time-division multiplexed with a pilot signal, in accordance with the illustrative embodiment of the present invention.
Figure 21:
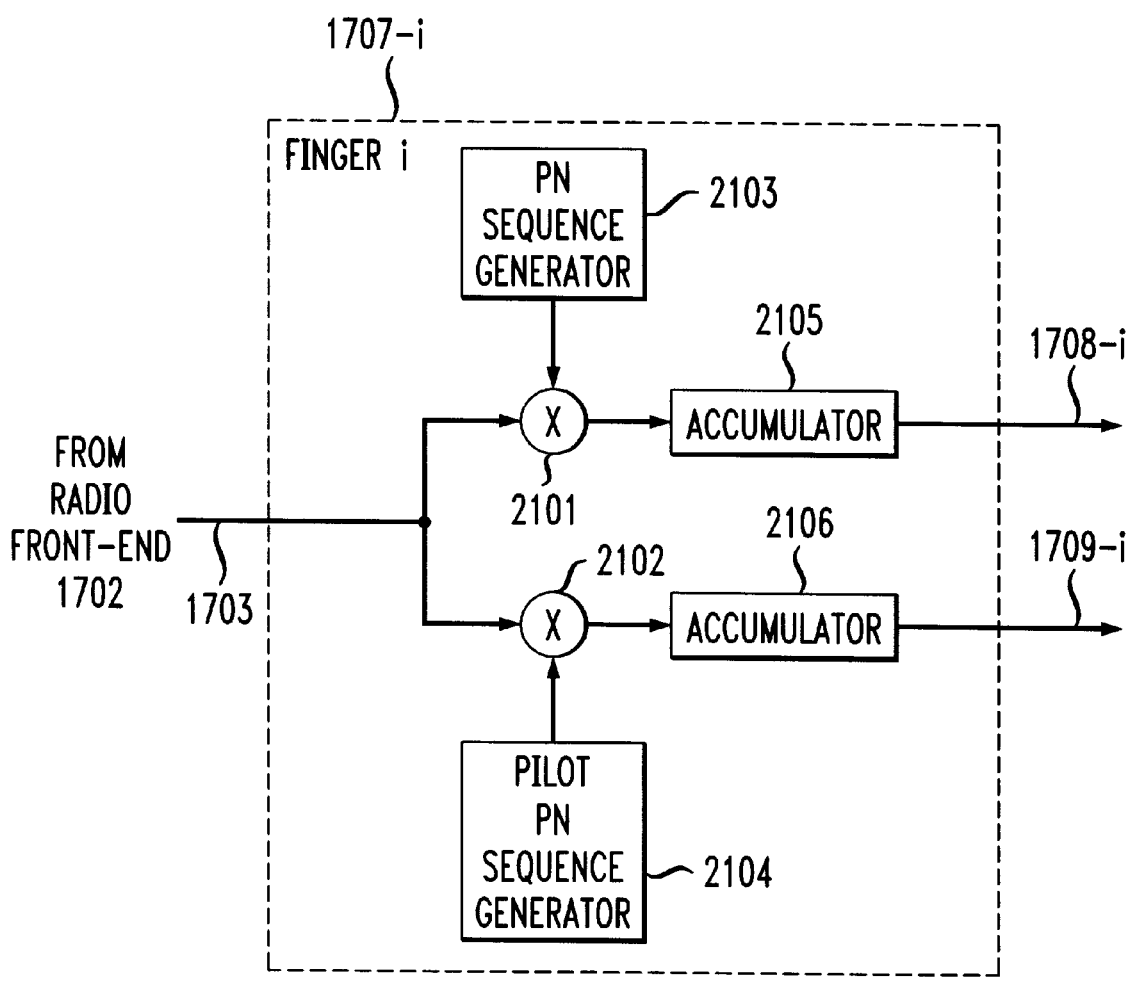
FIG. 21 depicts a block diagram of a finger in the wireless terminal in FIG. 17 that is capable of receiving an information-bearing signal that is code-division multiplexed with a pilot signal, in accordance with the illustrative embodiment of the present invention.
Figure 22:
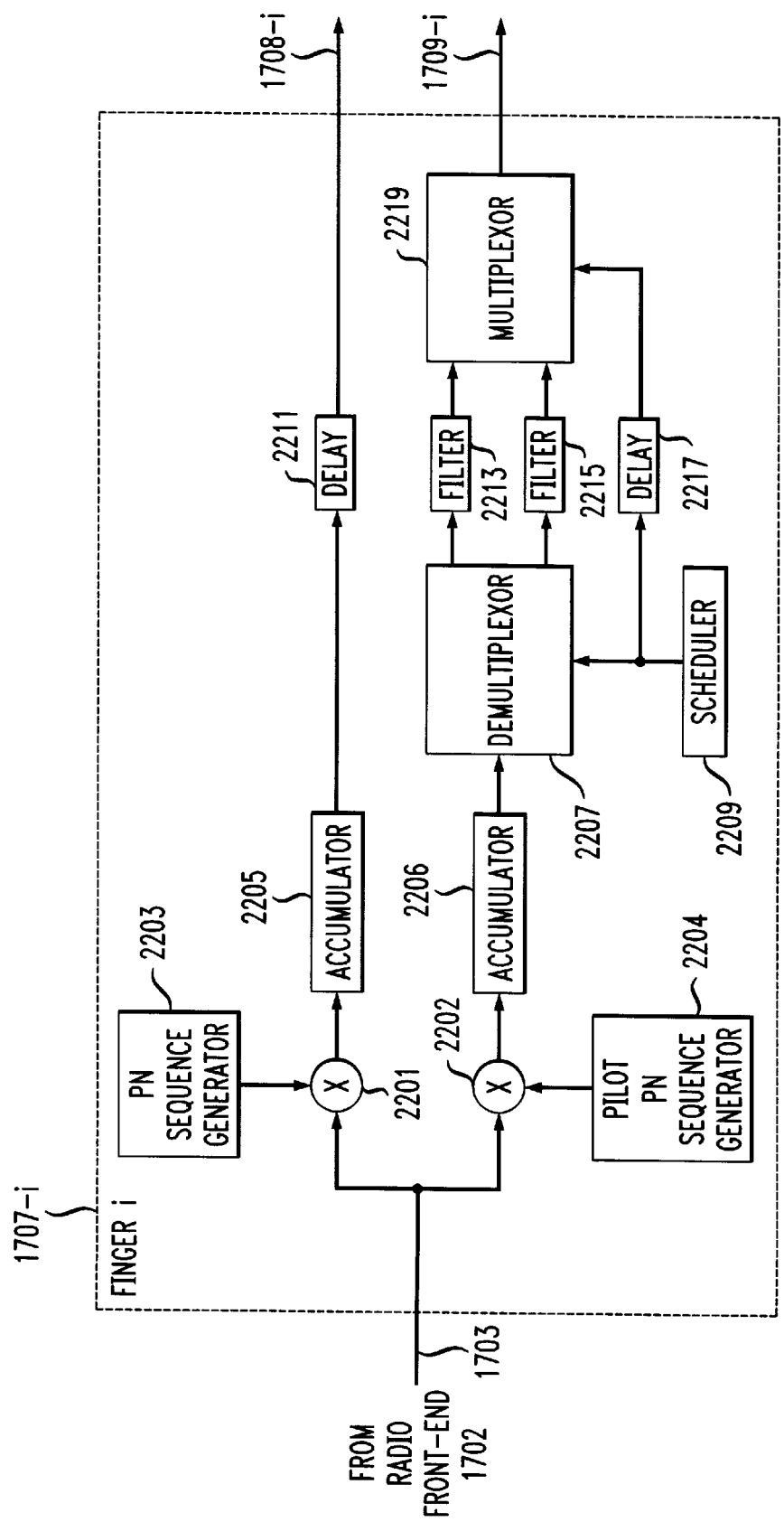
FIG. 22 depicts a block diagram of another finger in the wireless terminal in FIG. 17 that is capable of receiving an information-bearing signal that is code-division multiplexed with a pilot signal, in accordance with the illustrative embodiment of the present invention.

FIGS. 17 through 19 depict a wireless terminal that is designed to receive a pilot signal and an information-bearing signal that are time-division multiplexed into a single code-division multiplexed channel. In contrast, FIGS. 17, 21, and 22 depict a wireless terminal that is designed to receive a pilot signal and an information-bearing signal that are code-division multiplexed into a single frequency-delimited channel. Other figures are presented to facilitate and understanding of the various illustrative embodiments.

Transmitter Architectures

FIG. 5 depicts a block diagram of the salient components of base station 500, in accordance with the illustrative embodiment of the present invention, which transmits each of c information-bearing signals to a unique one of c wireless terminals (e.g., wireless terminal 511, wireless terminal 512). The forward channel equipment of base station 500 advantageously comprises: demultiplexor 501, forward channel radios 503-1 through 503-c, forward pilot radio 504, amplifier stage 505, antenna 507-1, and antenna 507-2, interconnected as shown.

In accordance with the illustrative embodiment, a wireless switching center (not shown) transmits a multiplexed data stream of symbols comprising m information-bearing signals to base station 500. As shown in FIG. 5, the multiplexed data stream of symbols is received by demultiplexor 501, which demultiplexes the data stream and routes one or more of the m information-bearing signals to one of c forward channel radios, 503-1 through 503-c. The function of each forward channel radio is to channel code and modulate one or more information-bearing signals in accordance with a multiplexing scheme (e.g., frequency-division multiplexing, time-division multiplexing, code-division multiplexing, etc.) in preparation for transmission to a wireless terminal. Furthermore, it will be clear to those skilled in the art that embodiments of the present invention can use any modulation scheme (e.g., amplitude modulation, frequency modulation, phase modulation, etc.).

FIG. 6 depicts a block diagram of one embodiment of forward channel radio 503-i, which is capable of using all forward channel multiplexing schemes with all modulation techniques. Although the illustrative embodiment in FIG. 6 is less complex than the other illustrative embodiments of forward channel radio 503-i, it clearly exhibits the salient aspects of the present invention.

In FIG. 6, forward channel radio 503-i advantageously receives one or more information-bearing signals from demultiplexor 501 and feeds it to modulator 611. Modulator 611 modulates the information-bearing signal(s) onto a carrier signal, in well-known fashion. The output of modulator 611 is advantageously fed to: (1)antenna 507-1 (via summer 701-1 in amplifier stage 505) and (2) antenna 507-2 (via signal inverter 613 and summer 701-2 in amplifier stage 505).

Signal inverter 613 generates an output signal that is based on inverting and alternately not inverting the input signal, in accordance with a schedule in scheduler 615. It is worth clarifying that signal inverter 613 advantageously does not delay the output signal, as in a traditional transmit diversity system, but inverts and alternately does not invert the input signal.

For the purpose of this specification, the term "inverting," and its inflected forms, is defined as equivalent to multiplying the input signal by negative one (−1), and the terms "not inverting," "non-inverting" and their analogues and inflected forms are defined as equivalent to multiplying the input signal by positive one (+1). It will be clear to those skilled in the art how to make and use signal inverter 613.

Scheduler 615 advantageously comprises the sequential logic to direct when signal inverter 613 inverts and does not invert the input signal. Furthermore, scheduler 615 advantageously directs signal inverter 613 in accordance with a schedule, which may be based on time. For example, the schedule could dictate that signal inverter 613 alternates between inverting and not inverting every 50 milliseconds. It will be clear to those skilled in the art how to make and use scheduler 615.

By transmitting the output of modulator 611 via antenna 507-1 and an inverted and alternately not inverted copy of the output of modulator 611 via antenna 507-2, the two signals interfere in two alternating patterns. When antennas 507-1 and 507-2 are separated by a distance equal to at least several wavelengths of the carrier of the transmitted signal, then the two patterns will differ in that they are unlikely to both create a multipath fade in the same location. In other words, one pattern may create one set of fades in one set of locations, and the other pattern may create another set of fades in another set of locations, but it is unlikely that both patterns will create a fade in the same location. Therefore, if a wireless terminal is in a fade during one of the two patterns, then it is unlikely to be in a fade during the other pattern. This fact, combined with the next, enables embodiments of the present invention to mitigate the effect of multipath fading.

The effect of multipath fading on a wireless terminal is related to the continuous amount of time that a wireless terminal is in a fade. When a wireless terminal spends a long time in a fade (e.g., one second), the wireless terminal may fail to receive so many consecutive bits that the wireless terminal is unable to create an acceptable estimate of the transmitted signal, even when an error detection and correction mechanism is employed. In contrast, when a wireless terminal spends a short time in a fade (e.g., 50 milliseconds), the wireless terminal may be capable of creating an acceptable estimate of the transmitted signal because a typical error detection and correction mechanism will overcome the shorter duration fades. Therefore, the effect of multipath fading can be mitigated if the length of time that a wireless terminal spends in a fade can be reduced.

One way to reduce the length of time that a wireless terminal spends in fade is to physically move the wireless terminal, as if it were in a moving automobile, to avoid its lingering in a fade. This is not, however, always practical—especially for wireless terminals that are stationary or moving slowly (e.g., walking, etc.).

Motion is relative, however, and rather than attempting to physically move the wireless terminal, forward channel radio 503-i endeavors to move the fades instead and, thus, to create the effect of physically moving the wireless terminal. Thus, by inverting and alternately not inverting the input signal, forward channel radio 503-i moves the fades and thus prevents a wireless terminal from lingering in a fade.

Furthermore, by controlling the rate at which the input signal is inverted and alternately not inverted, forward channel radio 503-i is capable of limiting the length of time that a wireless terminal spends in a fade. If the rate of inverting and alternately not inverting the input signal is high, then the amount of continuous time that a wireless terminal spends in a fade is low and the error detection and correction mechanism can overcome the effect of the short duration fade.

Therefore, scheduler 615 can ensure that a wireless terminal does not remain in a fade for long by directing signal inverter 613 to invert and alternately not invert the input signal at a high rate (e.g., 50 milliseconds) regardless of whether the wireless terminal is stationary or moving.

Figure 7:
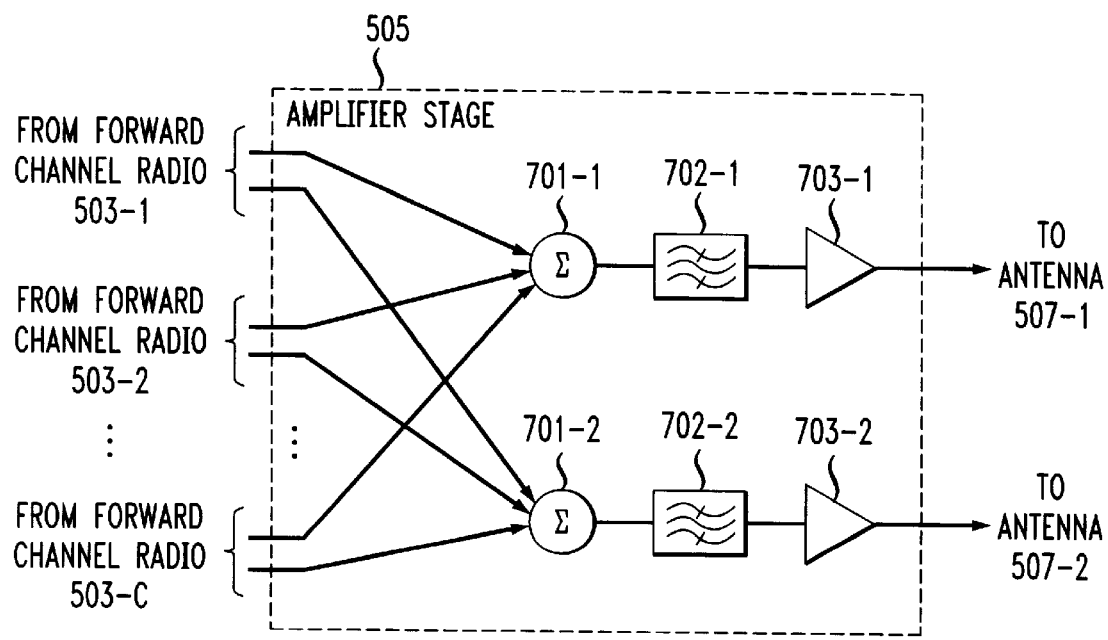
FIG. 7 depicts a block diagram of an amplifier stage in accordance with an illustrative embodiment of the present invention.

FIG. 7 depicts a block diagram of amplifier stage 505 in accordance with the illustrative embodiment of the present invention, which comprises: summers 701-1 and 701-2, filters 702-1 and 702-2, and amplifiers 703-1 and 703-2. Summer 701-1 receives the unaltered output signal of each forward channel radio, sums them, and outputs the composite signal to filter 702-1. Filter 702-1 is a bandpass filter that suppresses any spurious frequency components in the composite signal that lie outside the spectrum into which base station 500 is permitted to radiate. Amplifier 703-1 amplifies the composite signal and outputs the amplified signal to antenna 507-1.

The operation of summer 701-2, filter 702-2 and amplifier 703-2 is analogous to that summer 701-1, filter 702-1 and amplifier 703-1. Summer 701-2 receives the temporally altered output signal of each forward channel radio, sums them, and outputs the composite signal to filter 702-2. Filter 702-2 is a bandpass filter that suppresses any spurious frequency components in the composite signal that lie outside the spectrum into which base station 500 is permitted to radiate. Amplifier 703-2 amplifies the composite signal and outputs the amplified signal to antenna 507-2.

Referring again to FIG. 5, forward pilot radio 504 is used by some embodiments of the present invention, as described below, and antenna 507-1 and 507-2 are separated by a distance equal to at least several wavelengths of the carrier of the transmitted signal so that the multipath fading from each transmitted signal is independent.

Figure 8:
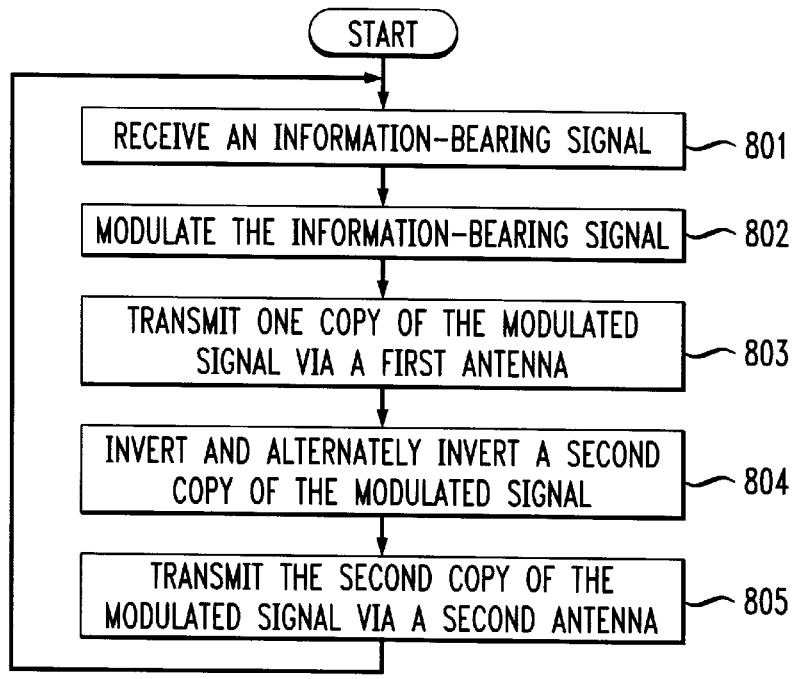
FIG. 8 depicts a flowchart of the operation of a forward channel radio in accordance with the illustrative embodiment of the present invention depicted in FIG. 6.

FIG. 8 depicts a flowchart of the operation forward channel radio 503-i in FIG. 6. At step 801, forward channel radio 503-i receives one or more information-bearing signals, and at step 802, the information-bearing signal(s) are modulated in well-known fashion. At step 803, one copy of the modulated signal is output via one antenna, and at step 804 a second copy of the modulated signal is advantageously inverted and alternately not inverted. A step 805, the second copy of the modulated signal is transmitted via a second antenna. It will be clear to those skilled in the art that the steps 803, 804, and 805 are distributive with respect to the other as are the steps of multiplication and addition in the expression:

$$A \cdot (B+C) = (A \cdot B) + (A \cdot C) \qquad (Eq.\ 1)$$

Figure 9:
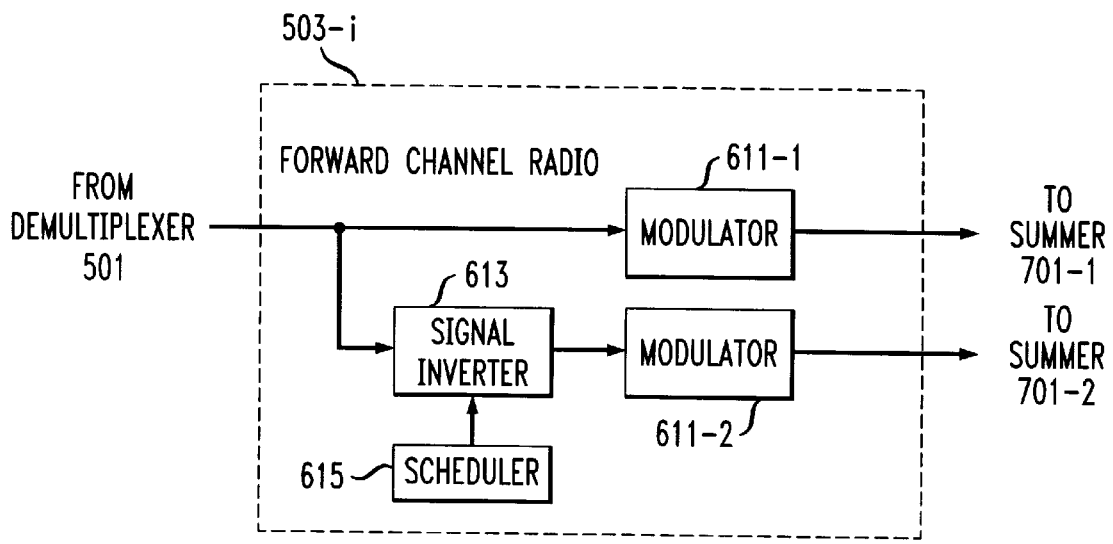
FIG. 9 depicts a block diagram of another forward channel radio in accordance with an illustrative embodiment of the present invention.

Therefore, it will be clear to those skilled in the art that the forward channel radio in FIG. 9 creates the same output signals as that in FIG. 6, albeit in a different way, provided that modulators 611-1 and 611-2 are a matched pair and synchronized.

FIG. 10 depicts a block diagram of the second illustrative embodiment of forward channel radio 503-i, which uses code-division multiplexing with phase modulation. Because a wireless terminal that uses code-division multiple access technology (hereinafter referred to as "CDMA") processes the respective phase-shifted images that cause multipath fading in a fundamentally different way than non-CDMA wireless terminals, a discussion of the operation of CDMA wireless terminals will facilitate an understanding of the illustrative embodiment in FIG. 10.

Although the multiple phase-shifted images that cause multipath fading can hinder a non-CDMA wireless terminal, a CDMA wireless terminal, in contrast, actually benefits from multiple phase-shifted images. A CDMA wireless terminal isolates and analyzes the multiple phase-shifted images and attempts to identify the strongest of those images. It then demodulates each of the strongest images, and then combines them to produce a better estimate of the transmitted signal than could be obtained from any single image.

The disparate phase shift of the different images can, however, complicate the combination of the demodulated images. Because each image travels a different path from the transmitter to the receiver, it is highly unlikely that the distance traveled by all of the images will be exactly the same. As mentioned above, any discrepancy in the relative distance traveled is manifested as a relative time-delay in the images with respect to each other. Furthermore, any time-delay in an image that does not exactly equal an integral number of wavelengths of the carrier signal is manifested by a partial phase shift in the image with respect to the other images. In some cases, this partial phase shift can frustrate the CDMA wireless terminal from properly combining the various images.

For example, when base station 500 uses a modulation scheme that does not affect the phase of the carrier (e.g., amplitude modulation, frequency modulation, etc.), the partial phase shift of the images at the receiver is irrelevant and does not affect the ability of a CDMA wireless terminal to combine the various images. In contrast, when base station 500 uses a modulation scheme that does modulate the phase of the carrier signal (e.g., quadrature phase-shift keying, etc.), the partial phase shift of the respective images complicates the task of combining the various images. In particular, the partial phase shift of the respective images must be compensated for before the various images can be combined. Typically, the partial phase shift of the images is compensated for by realigning their phase.

To assist a wireless terminal in phase-aligning the respective images, base station 500 uses a technique called "pilot-aided CDMA". In accordance with pilot-aided CDMA, base station 500 transmits a pilot signal in addition to an information-bearing signal to each wireless terminal. The information-bearing signal carries the information payload to the wireless terminal. In contrast, the pilot signal carries no user information but is used by the wireless terminal to estimate the partial phase shift experienced by each of the phase-shifted images of the information-bearing signal.

Typically, the pilot signal and the information-bearing signal are transmitted at the same frequency from the same antenna so that they will experience the same environmental effects and the same partial phase shift. Unlike the information-bearing signal, which is at least partially phase modulated, the pilot signal is transmitted with an invariant phase.

Because each image of the pilot signal traverses the same path as the image of its associated information-bearing signal, each image of the pilot signal experiences the same phase shift as the image of its associated information-bearing signal. Therefore, a CDMA wireless terminal can reasonably estimate the phase shift of each image of an information-bearing signal by examining the phase shift of the image of the associated pilot signal. With these estimates, the CDMA wireless terminal can phase-align the images of the information-bearing signal and so properly combine them.

As mentioned above, the pilot signal and the information-bearing signal are typically transmitted at the same frequency from the same antenna to ensure that they both experience the same partial phase shift. There are two techniques for accomplishing this.

Figure 11:
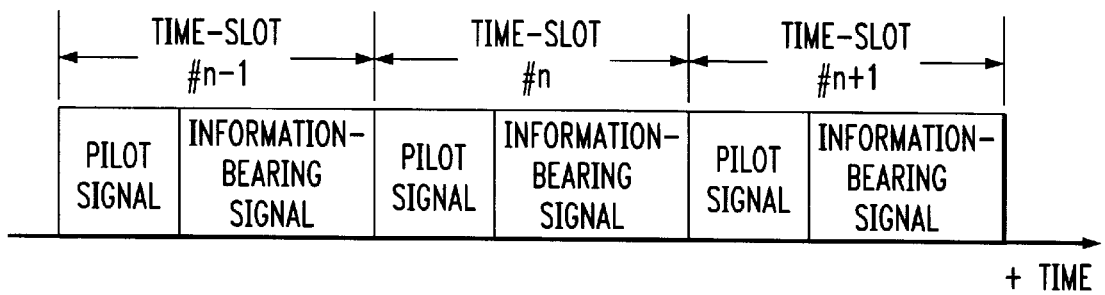
FIG. 11 depicts a graph of an information-bearing signal that is time-division multiplexed with a pilot signal into a succession of time-slots.

In accordance with the first technique, the pilots signal and the information-bearing signal are time-division multiplexed into a single code-division channel. FIG. 11 depicts a graph that aids in understanding the first technique. In FIG. 11, a pilot signal and an information-bearing signal are time-division multiplexed such that each pair of pilot signal and information-bearing signal define a time-slot, regardless of which occurs first in the time-slot and regardless of the percentage of time each occupies in the time-slot. The forward channel radio in FIG. 10 uses the first technique.

In accordance with the second technique, the pilot signal and the information-bearing signal are code-division multiplexed in a single frequency-delimited channel. In other words, both the pilot signal and the information-bearing signal are transmitted simultaneously in the same frequency-delimited channel, but are multiplexed using different orthogonal codes. The forward channel radio in FIG. 15 uses the second technique.

Referring to the forward channel radio depicted in FIG. 10, forward channel radio 503-i advantageously receives an information-bearing signal from demultiplexor 501 and channel encodes the information-bearing signal with channel encoder 1001, in well-known fashion. The purpose of channel encoder 1001 is to encrypt the information-bearing signal for privacy and to enable a wireless terminal to detect and correct errors that occur during transmission. The encoded information-bearing signal from channel encoder 1001 is fed to time-division multiplexor 1005.

Pilot signal generator 1003 generates a pilot signal, in well-known fashion, and outputs it to time-division multiplexor 1005.

Time-division multiplexor 1005 accepts the encoded information-bearing signal from channel encoder 1001 and the pilot signal from pilot signal generator 1003 and time-division multiplexes them to generate a time-division multiplexed pilot signal. For the purpose of this specification, a "time-division multiplexed pilot signal" is defined as an information-bearing signal that is time-division multiplexed with a pilot signal into a succession of time-slots. Furthermore, this definition holds regardless of which occurs first in the time-slot and regardless of the percentage of time each occupies in the time-slot.

The time-division multiplexed pilot signal is fed into multiplier 1007, which spreads the time-division multiplexed pilot signal with the output of pseudo-noise sequence generator 1009 to generate a "time-division multiplexed pilot-aided direct-sequence spread-spectrum signal." For the purpose of this specification, a "time-division multiplexed pilot-aided direct-sequence spread-spectrum signal" is defined as signal comprising a succession of time-slots, wherein each time-slot comprises a time-division multiplexed pilot signal and information-bearing signal that have been spread to form a direct-sequence spread-spectrum signal. For the purpose of this specification, a "direct-sequence spread-spectrum signal" is defined as a first signal multiplied by a deterministic sequence that has a symbol rate greater than the symbol rate of the first signal. The output of multiplier 1007 is depicted in FIG. 11.

The output of multiplier 1007 is fed to modulator 1011, which modulates the time-division multiplexed pilot-aided direct-sequence spread-spectrum signal onto a carrier signal. It will be clear to those skilled in the art how to make and use channel encoder 1001, pilot signal generator 1003, time-division multiplexor 1005, multiplier 1007, pseudo-noise sequence generator 1009 and modulator 1011. The output of modulator 1011 is advantageously fed to: (1)antenna 507-1 (via summer 701-1 in amplifier stage 505) and (2)antenna 507-2 (via signal inverter 1013 and summer 701-2 in amplifier stage 505).

Signal inverter 1013 is identical to signal inverter 613 in FIG. 6. Scheduler 1015 advantageously comprises the sequential logic that is capable of directing when signal inverter 1013 inverts and does not invert the input signal. Furthermore, scheduler 1015 advantageously directs signal inverter 1013 in accordance with a schedule, which may be based on a temporal schedule or on time-slots, or on a deterministic sequence or on any combination of these. For example, when the input to signal inverter 1013 comprises a series of time-slots, scheduler 1015 can direct signal inverter 1013 to invert the input during alternate time-slots. For the purpose of this specification, the term "alternate time-slot" is defined as every other time-slot. Alternatively, when the input to signal inverter 1013 comprises a series of time-slots, scheduler 1015 can direct signal inverter 1013 to invert the output in accordance with a deterministic schedule, such as a pseudo-noise sequence.

Figure 12:
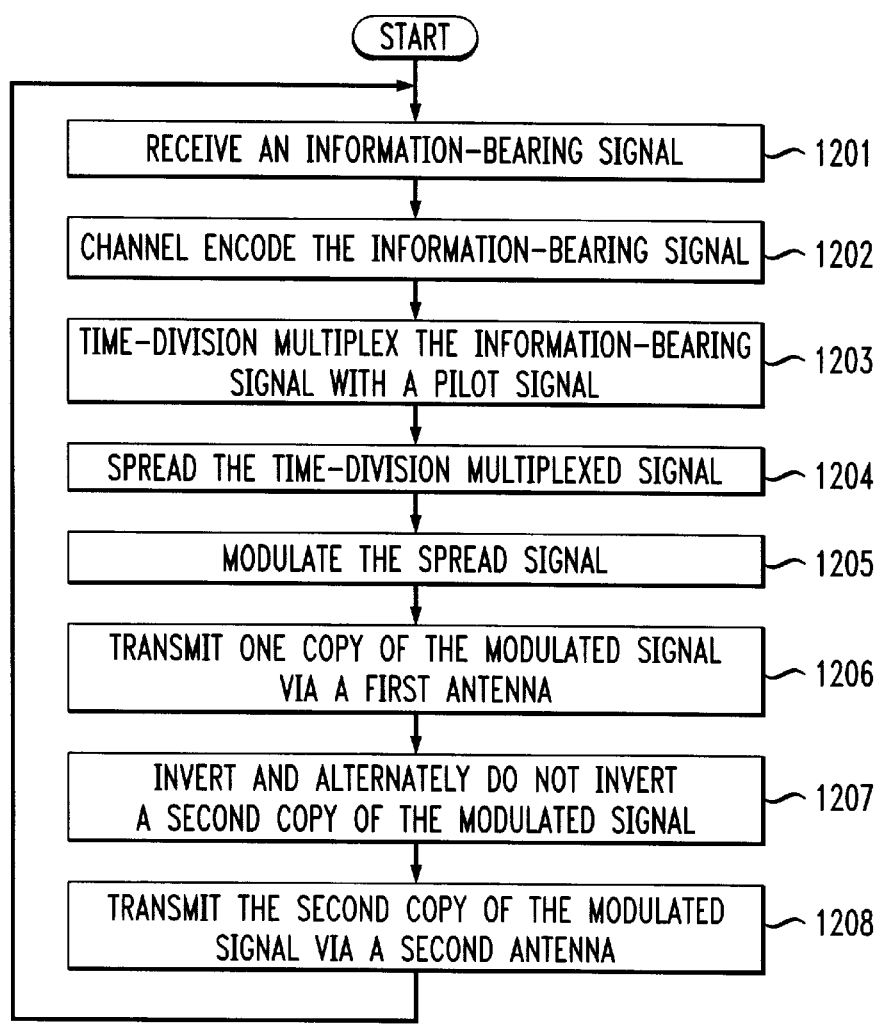
FIG. 12 depicts a flowchart of the operation of the wireless terminal of FIG. 10.

FIG. 12 depicts a flowchart of the operation of forward channel radio 503-i in FIG. 10. At step 1201, forward channel radio 503-i receives an information-bearing signal from demodulator 501.

At step 1202, the information-bearing signal is channel encoded to encrypt the information-bearing signal for privacy and to enable a wireless terminal to detect and correct errors that occur during transmission.

At step 1203, the information-bearing signal is time-division multiplexed with a pilot signal to produce a time-division multiplexed signal, and at step 1204, the time-division multiplexed signal is spread, in well-known fashion, to generate a time-division multiplexed pilot-aided direct-sequence spread-spectrum signal.

At step 1205, the time-division multiplexed pilot-aided direct-sequence spread-spectrum signal is modulated, in well-known fashion, onto a carrier signal, and at step 1206, a first copy of the modulated signal is transmitted via a first antenna.

At step 1207, a second copy of the modulated signal is advantageously inverted and alternately not inverted. At step 1208, the second copy of the modulated signal is transmitted via a second antenna. From step 1208, control moves to step 1201.

It will be clear to those skilled in the art that the step of inverting and alternately not inverting (i.e., step 1207) is distributive with respect to the steps of spreading (i.e., step 1204) and modulating (ie., step 1205). Therefore, the forward channel radio in FIG. 13 outputs the same signals as that in FIG. 10, albeit in a different way, provided that modulators 1311-1 and 1311-2 are a matched pair and synchronized. Analogously, the forward channel radio in FIG. 14 outputs the same signals as that in FIG. 10, albeit in a different way, provided that modulators 1411-1 and 1411-2 are a matched pair and synchronized. It will be clear to those skilled in the art how to make and use the forward channel radios depicted in FIGS. 10, 13 and 14.

FIGS. 15 and 16 depict block diagrams of forward channel radio 503-i and forward pilot radio 504, respectively, in which the pilot signal and the information-bearing signal are transmitted simultaneously in the same frequency-delimited channel, but are multiplexed using different orthogonal codes. In accordance with this embodiment, the information-bearing signal is spread and modulated in one radio (depicted in FIG. 15) and the pilot signal is generated, spread, and modulated in a separate radio (depicted in FIG. 16).

The forward channel radio in FIG. 15 receives an information-bearing signal from demultiplexor 501 and channel encodes the information-bearing signal with channel encoder 1501. Channel encoder 1501 is identical in function to channel encoder 1001 described above.

The output of channel encoder 1501 is fed into multiplier 1507, which spreads the signal with the output of pseudo-noise sequence generator 1509 to generate a direct-sequence spread-spectrum signal. Pseudo-noise sequence generator 1509 is identical in function to pseudo-noise sequence generator 1009 described above.

The output of multiplier 1507 is fed to modulator 1511, which modulates direct-sequence spread-spectrum signal onto a carrier signal. Modulator 1511 is identical to modulator 1011 described above. The output of modulator 1511 is advantageously fed to: (1)antenna 507-1 (via summer 701-1 in amplifier stage 505) and (2)antenna 507-2 (via signal inverter 1513 and summer 701-2 in amplifier stage 505). Signal inverter 1513 and scheduler 1515 are identical to signal inverter 613 and scheduler 615, respectively.

FIG. 16 depicts a block diagram of forward pilot radio 504, which generates a phase invariant pilot signal with pilot signal generator 1603. Pilot signal generator 1603 is identical to pilot signal generator 1603 described above.

The output of pilot signal generator 1603 is fed into multiplier 1607, which spreads the signal with the output of pilot pseudo-noise sequence generator 1609 to generate a direct-sequence spread-spectrum signal. Pseudo-noise sequence generator 1609 is identical to pseudo-noise sequence generator 1509 described above, except that it generates a different code so that the pilot signal and the information-bearing signal are code-division multiplexed.

The output of multiplier 1607 is fed to modulator 1611, which modulates direct-sequence spread-spectrum signal onto a carrier signal. Modulator 1611 is identical to modulator 1011 described above. The output of modulator 1611 is advantageously fed to: (1)antenna 507-1 (via summer 701-1 in amplifier stage 505) and (2)antenna 507-2 (via signal inverter 1613 and summer 701-2 in amplifier stage 505). Signal inverter 1613 and scheduler 1615 are identical to signal inverter 1513 and scheduler 1515, respectively. It will be clear to those skilled in the art how to make and use the forward channel radio in FIG. 15, and the forward pilot radio in FIG. 16.

Receiver Architectures

When either the information-bearing signal or the pilot signal is phase modulated by base station 500, the inverting and alternate not inverting affects a 180° phase shift in the inverted signal, which is advantageously compensated for in wireless terminal 511. FIG. 17 depicts a block diagram of the salient components of an illustrative wireless terminal that is capable of receiving a pilot-aided direct-sequence spread-spectrum signal and outputting an estimate of the transmitted signal. CDMA receiver 511 comprises: antenna 1701, radio front-end 1702 and rake receiver 1705. Rake receiver 1705 typically comprises a bank of N fingers, 1707-1 through 1707-N, each of which outputs a constituent information-bearing signal, $I_i(n)$, and an associated conjugate pilot estimate, $P_i(n)$, for i=1 to N, wherein n indicates the temporal sequence of the received signals. Each constituent information-bearing signal, $I_i(n)$, and its associated conjugate pilot estimate, $P_i(n)$, are multiplied by a conjugate pilot multiplier, and quasi-coherently combined by combiner 1712, in well-known fashion, to provide an estimate, $Î(n)$, of the originally transmitted information-bearing signal.

When the pilot signal and the information-bearing signal are time-division multiplexed into a single code-division multiplexed channel, wireless terminal 511 must time-division demultiplex the pilot signal from the information-bearing signal using, for example, the finger design depicted in FIG. 18. In contrast, when the pilot signal and the information-bearing signal are code-division multiplexed into a single frequency-delimited channel, wireless terminal 511 must code-division demultiplex the pilot signal from the information-bearing signal using, for example, the finger design depicted in FIG. 20.

FIG. 18 depicts a block diagram of the salient components of finger 1707-i, which time-division demultiplexes a pilot signal from an information-bearing signal and corrects for the inverting and alternately not inverting of the pilot signal.

The finger in FIG. 18 receives a plurality of code-division multiplexed signals on lead 1703 from radio front-end 1702 and feeds the signals into multiplier 1801. Pseudo-noise sequence generator 1803 is identical to pseudo-noise sequence generator 1009 (in FIG. 10) and feeds the same pseudo-noise sequence to multiplier 1801 to despread the signal of interest.

The output of multiplier 1801 is fed into accumulator 1804, which accumulates the despread signal, in well-known fashion, to improve the fidelity of the despread signal. The output of accumulator 1804 is fed into time-division demultiplexor 1805, which performs the inverse function of time-division multiplexor 1005 (in FIG. 10) and outputs the information-bearing signal on lead 1708-i and the pilot signal on lead 1709-i. It will be clear to those skilled in the art that the information-bearing signal comprises "inverted information-bearing signals" that are interleaved with "non-inverted information-bearing signals" and the pilot signal comprises inverted "inverted pilot signals" interleaved with "non-inverted pilot signals." For the purpose of this specification, the term "inverted information-bearing signal" and its inflected forms is defined as an information-bearing signal that is transmitted when the signal inverter (e.g., signal inverter 613, signal inverter 1013, etc.) is inverting its input, and the term "non-inverted information-bearing signal" and its inflected forms is defined as an information-bearing signal that is transmitted when the signal inverter is not inverting its input. Furthermore, for the purpose of this specification, the term "inverted pilot signal" and its inflected forms is defined as a pilot signal that is transmitted when the signal inverter (e.g., signal inverter 613, signal inverter 1613, etc.) is inverting its input, and the term "non-inverted pilot signal" and its inflected forms is defined as a pilot signal that is transmitted when the signal inverter is not inverting its input.

Furthermore, time-division multiplexor 1805 outputs the information-bearing signal and the pilot signal so that the phase of the inverted information-bearing signals are adjusted (e.g., multiplied, etc.) by the inverted pilot signal, and the phase of the non-inverted information-bearing signals are adjusted (e.g., multiplied, etc.) by the non-inverted pilot signal. The illustrative embodiment of finger 1707-i in FIG. 18, however, does not filter the pilot signals before they are used to adjust the phase of the information-bearing signals.

FIG. 19 depicts a block diagram of the salient components of finger 1707-i which does filter the pilot signals before they are used to adjust the phase of the information-bearing signals. Like the finger in FIG. 17, the finger in FIG. 19 receives a plurality of code-division multiplexed signals on lead 1703 from radio front-end 1702 and feeds the signals into multiplier 1901. Pseudo-noise sequence generator 1903 is identical to pseudo-noise sequence generator 1009 (in FIG. 10) and feeds the same pseudo-noise sequence to multiplier 1901 to despread the signal of interest. The output of multiplier 1901 is fed into accumulator 1904, which accumulates the despread signal, in well-known fashion, to improve the fidelity of the despread signal.

The output of accumulator 1904 is fed into time-division demultiplexor 1905, which performs the inverse function of time-division multiplexor 1005 (in FIG. 10) and outputs the information-bearing signal to delay 1911 and the pilot signal to demultiplexor 1907.

Demultiplexor 1907 demultiplexes the pilot signal from time-division demultiplexor 1905 into an inverted pilot signal and a non-inverted pilot signal, under the direction of scheduler 1909. Scheduler 1909 is identical to scheduler 1015 (in FIG. 10). The inverted pilot signal is fed into filter 1913 and the non-inverted pilot signal is fed into filter 1915, respectively. Filters 1913 and 1915 are advantageously matched, low pass filters that mitigate spurious changes in the pilot signals. It will be clear to those skilled in the art how to make and use filters 1913 and 1915.

The output of filter 1913 and filter 1915 are re-multiplexed under the direction of scheduler 1909 to create a corrected pilot signal on lead 1709-i that can be used to compensate the partial phase shift of the information-bearing signal emitted on lead 1708-i. Delay 1911 and delay 1917 maintain the synchronization of the information-bearing signals and the pilot signals so that the phase of the inverted information-bearing signals are adjusted (e.g., multiplied, etc.) by the inverted pilot signal, and the phase of the non-inverted information-bearing signals are adjusted (e.g., multiplied, etc.) by the non-inverted pilot signal. It will be clear to those skilled in the art how to make and use finger 1707-i in FIG. 19.

Figure 20:
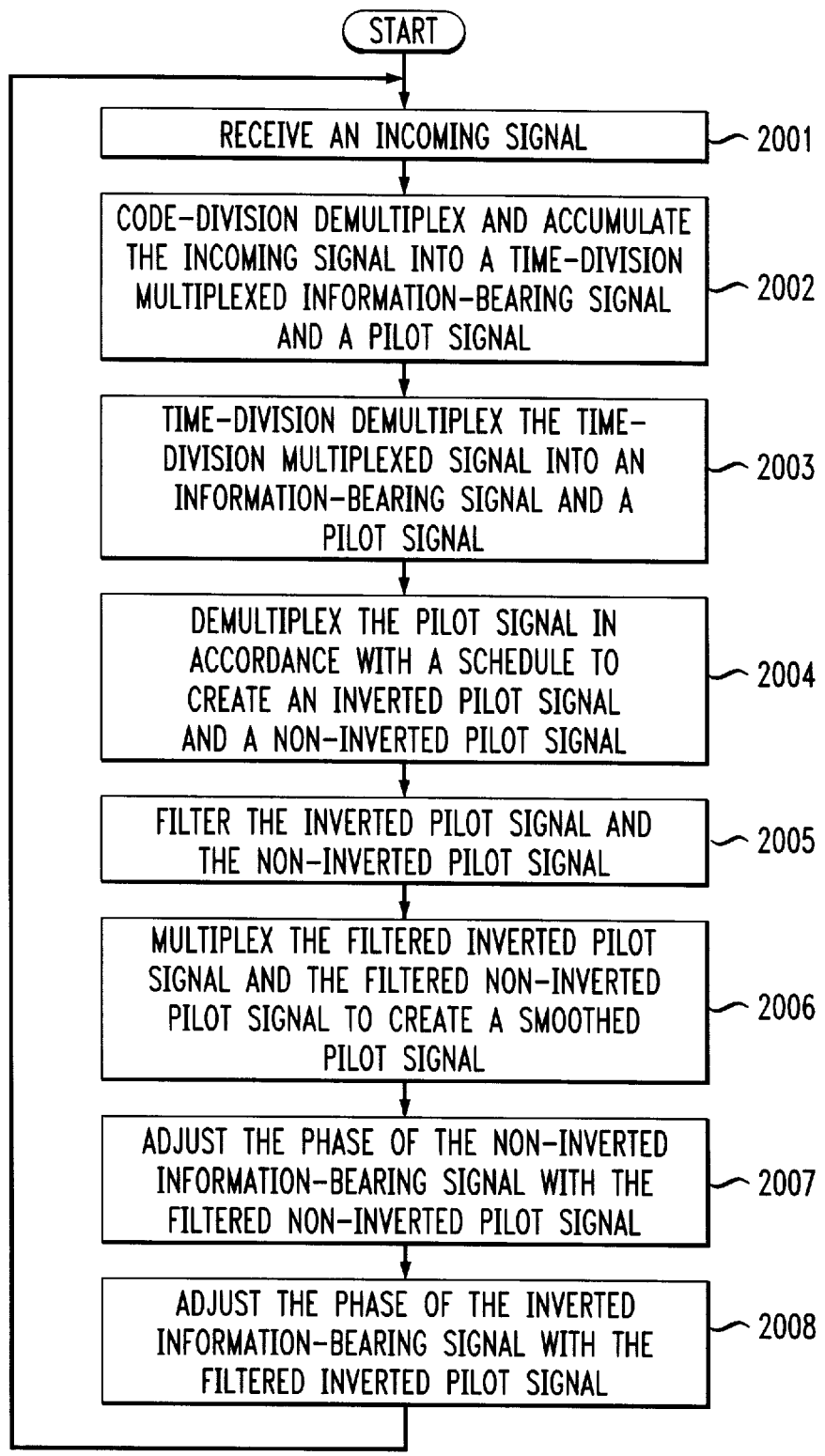
FIG. 20 depicts a flowchart of the operation of the finger in FIG. 19.

FIG. 20 depicts a flowchart of the operation of the finger in FIG. 19. At step 2001, finger 1707-i receives an incoming signal, and at step 2002, code-division demultiplexes (e.g., despreads) the incoming signal to create a time-division multiplexed signal, in well-known fashion.

At step 2003, finger 1707-i time-division demultiplexes the time-division multiplexed signal into an information-bearing signal and a pilot signal. At step 2004, finger 1707-i demultiplexes the pilot signal into an inverted pilot signal and a non-inverted pilot signal, in accordance with a schedule.

At step 2005, finger 1707-i filters the inverted pilot signal to create a filtered inverted pilot signal and filters the non-inverted pilot signal to create a filtered non-inverted pilot signal. At step 2006, finger 1707-i multiplexes the filtered inverted pilot signal and the filtered non-inverted pilot signal, in accordance with the schedule in step 2004, to create a smoothed pilot signal.

At step 2007, the non-inverted information-bearing signal is adjusted based on the filtered non-inverted pilot signal, and at step 2008, the inverted information-bearing signal is adjusted based on the filtered inverted pilot signal. From step 2008, control returns to step 2001. It will be clear to those skilled in the art how to make and use wireless terminals that are capable of receiving a pilot signal and an information-bearing signal that are time-division multiplexed into a single code-division multiplexed channel.

FIG. 21 depicts a block diagram of the salient components of finger 1707-i, which is designed to receive a pilot signal and an information-bearing signal that are code-division multiplexed into a single frequency-delimited channel. The finger in FIG. 21 receives a plurality of code-division multiplexed signals on lead 1703 from radio front-end 1702 and feeds the signals into multiplier 2101 and multiplier 2102. Pseudo-noise sequence generator 2103 is identical to pseudo-noise sequence generator 1505 (in FIG. 15) and feeds the same pseudo-noise sequence to multiplier 2101 to code-division demultiplex (i.e., despread) the infonnation-bearing signal of interest. The information-bearing signal is then fed into accumulator 2105, which accumulates the despread signal, in well-known fashion, to improve the fidelity of the despread signal. The output of accumulator 2105 is output on lead 1708-i.

Analogously, pilot pseudo-noise sequence generator 2104 is identical to pilot pseudo-noise sequence generator 1605 (in FIG. 16) and feeds the same pseudo-noise sequence to multiplier 2102 to code-division demultiplex (e.g., despread) the pilot signal. The pilot signal is then fed into accumulator 2106, which accumulates the despread signal, in well-known fashion, to improve the fidelity of the despread signal. The output of accumulator 2106 is output on lead 1709-i. It will be clear to those skilled in the art that the information-bearing signal comprises inverted information-bearing signals interleaved with non-inverted information-bearing signals and that the pilot signal comprises inverted pilot signals interleaved with non-inverted pilot signals. The finger in FIG. 21 is, however, disadvantageous in that it does not filter the pilot signals before they are used to adjust the phase of the information-bearing signals.

FIG. 22 depicts a block diagram of the salient components of finger 1707-i which does filter the pilot signals before they are used to adjust the phase of the information-bearing signals. Finger 1707-i in FIG. 22 receives a plurality of code-division multiplexed signals on lead 1703 from radio front-end 1702 and feeds the signals into multiplier 2201 and multiplier 2202. Pseudo-noise sequence generator 2203 is identical to pseudo-noise sequence generator 1505 (in FIG. 15) and feeds the same pseudo-noise sequence to multiplier 2201 to code-division demultiplex (e.g, despread) the information-bearing signal of interest. The information-bearing signal is then fed into accumulator 2205, which accumulates the despread signal, in well-known fashion, to improve the fidelity of the despread signal. The output of accumulator 2205 is output to delay 2211.

Analogously, pilot pseudo-noise sequence generator 2204 is identical to pilot pseudo-noise sequence generator 1605 (in FIG. 16) and feeds the same pseudo-noise sequence to multiplier 2202 to code-division demultiplex (e.g., despread) the pilot signal. The pilot signal is then fed into accumulator 2206, which accumulates the despread signal, in well-known fashion, to improve the fidelity of the despread signal. The output of accumulator 2206 is output to demultiplexor 2207.

Demultiplexor 2207 demultiplexes the pilot signal into an inverted pilot signal and a non-inverted pilot signal, under the direction of scheduler 2209. Scheduler 2209 is identical to scheduler 1015 (in FIG. 10). The inverted pilot signal is fed into filter 2213 and the non-inverted pilot signal is fed into filter 2215, respectively. Filters 2213 and 2215 are advantageously matched, low pass filters that mitigate spurious changes in the pilot signals. It will be clear to those skilled in the art how to make and use filters 2213 and 2215.

The output of filter 2213 and filter 2215 are re-multiplexed under the direction of scheduler 2209 to create a corrected pilot signal on lead 2209-i that can be used to compensate the partial phase shift of the information-bearing signal emitted on lead 2208-i. Delay 2211 and delay 2217 maintain the synchronization of the information-bearing signals and the pilot signals so that the phase of the inverted information-bearing signals are adjusted (e.g., multiplied, etc.) by the inverted pilot signal, and the phase of the non-inverted information-bearing signals are adjusted (e.g., multiplied, etc.) by the non-inverted pilot signal. It will be clear to those skilled in the art how to make and use finger 1707-i in FIG. 22.

Figure 23:
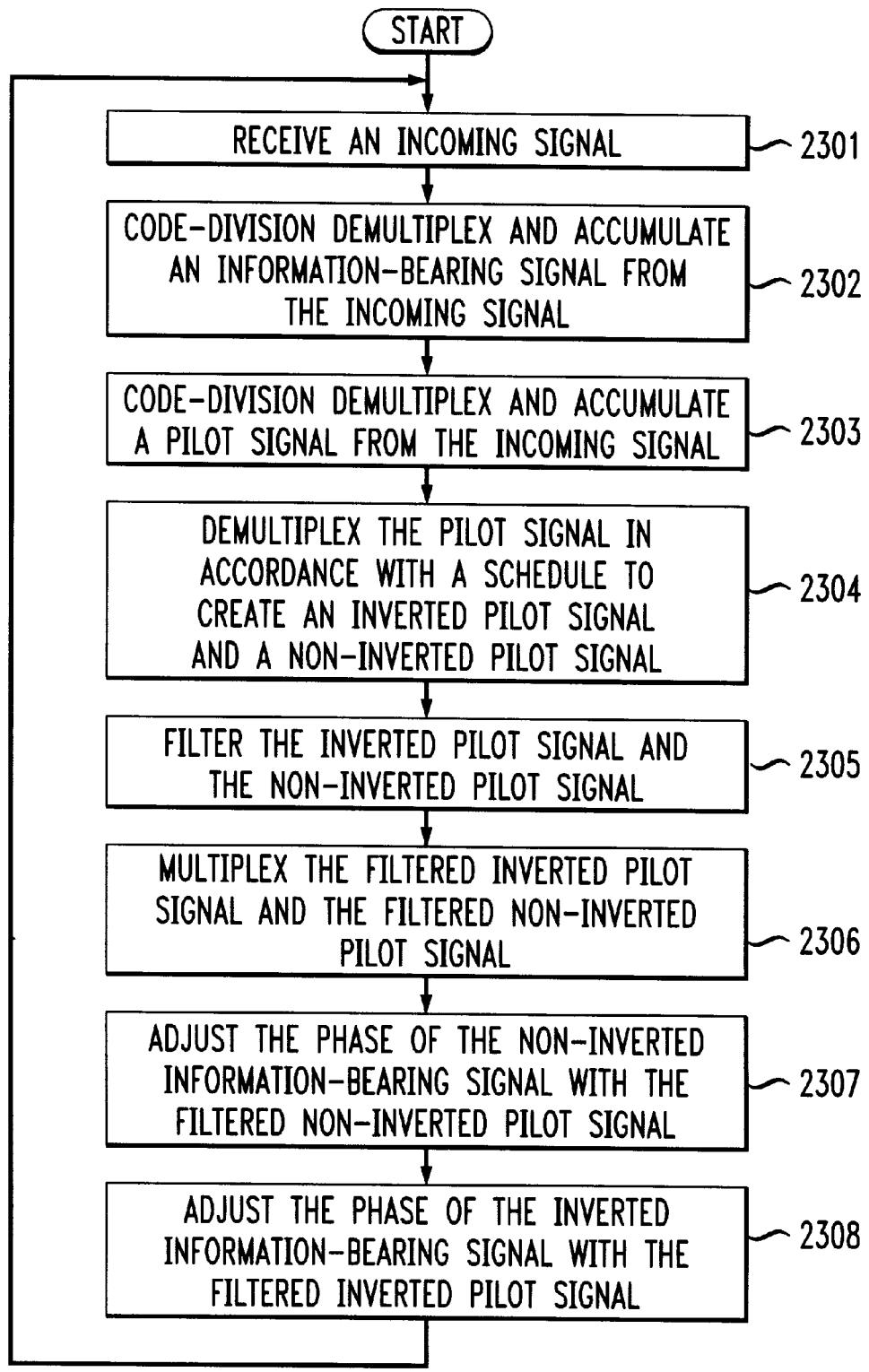
FIG. 23 depicts a flowchart of the operation of the finger in FIG. 22.

FIG. 23 depicts a flowchart of the operation of the finger in FIG. 22. At step 2301, finger 1707-i receives an incoming signal, and at step 2302, code-division demultiplexes (e.g., despreads) the incoming signal to create an information-bearing signal, in well-known fashion.

At step 2303, finger 1707-i code-division demultiplexes and accumulates the incoming signal to create a pilot signal.

At step 2304, finger 1707-i demultiplexes and accumulates the pilot signal into an inverted pilot signal and a non-inverted pilot signal, in accordance with a schedule.

At step 2305, finger 1707-i filters the inverted pilot signal to create a filtered inverted pilot signal and filters the non-inverted pilot signal to create a filtered non-inverted pilot signal. At step 2306, finger 1707-i multiplexes the filtered inverted pilot signal and the filtered non-inverted pilot signal, in accordance with the schedule in step 2304, to create a smoothed pilot signal.

At step 2307, the non-inverted information-bearing signal is adjusted based on the filtered non-inverted pilot signal, and at step 2308, the inverted information-bearing signal is adjusted based on the filtered inverted pilot signal. From step 2308, control returns to step 2301. It will be clear to those skilled in the art how to make and use wireless terminals that are capable of receiving a pilot signal and an information-bearing signal that are code-division multiplexed into a single frequency-delimited channel.

It is to be understood that the above-described embodiments are merely illustrative of the invention and that many variations may be devised by those skilled in the art without departing from the scope of the invention. It is therefore intended that such variations be included within the scope of the following claims and their equivalents.

What is claimed is:

1. A method comprising:
   inverting and alternately not-inverting a first signal in accordance with a schedule to create a second signal;
   transmitting said first signal via a first antenna; and
   transmitting said second signal via second antenna.

2. The method of claim 1 wherein said first signal is a direct-sequence spread-spectrum signal.

3. The method of claim 1 wherein said first signal is a time-division multiplexed pilot-aided direct-sequence spread-spectrum signal.

4. The method of claim 3 wherein said first signal comprises a succession of time-slots and said schedule inverts said first signal during alternate time-slots.

5. The method of claim 3 wherein said first signal comprises a succession of time-slots and said schedule inverts said first signal in accordance with a pseudo-noise sequence.

6. An apparatus comprising:
   a signal inverter for inverting and alternately not-inverting a first signal in accordance with a schedule to create a second signal;
   a first antenna for transmitting said first signal; and
   a second antenna for transmitting said second signal.

7. The apparatus of claim 6 wherein said first signal is a direct-sequence spread-spectrum signal.

8. The apparatus of claim 7 wherein said first signal is a time-division multiplexed pilot-aided direct-sequence spread-spectrum signal.

9. The apparatus of claim 6 wherein said first signal comprises a succession of time-slots and said schedule inverts said first signal during alternate time-slots.

10. The apparatus of claim 9 wherein said first signal comprises a succession of time-slots and said schedule inverts said first signal in accordance with a pseudo-noise sequence.

11. A method comprising:
    spreading an information signal to generate a direct-sequence spread-spectrum signal;
    time-division multiplexing said direct-sequence spread-spectrum signal with a pilot signal to generate a first time-division multiplexed pilot-aided direct-sequence spread-spectrum signal, which is partitioned into a series of time-slots; and
    inverting and alternately not-inverting said first time-division multiplexed pilot-aided direct-sequence spread-spectrum signal in accordance with a schedule to create a second time-division multiplexed pilot-aided direct-sequence spread-spectrum signal.

12. The method of claim 11 further comprising:
    transmitting said first time-division multiplexed pilot-aided direct-sequence spread-spectrum signal via a first antenna; and
    transmitting said second time-division multiplexed pilot-aided direct-sequence spread-spectrum signal via a second antenna.

13. The method of claim 11 wherein said first time-division multiplexed pilot-aided direct-sequence spread-spectrum signal comprises a succession of time-slots and said schedule inverts said first time-division multiplexed pilot-aided direct-sequence spread-spectrum signal during alternate time-slots.

14. An apparatus comprising:
    a multiplier for spreading an information signal to generate a direct-sequence spread-spectrum signal;
    a time-division multiplexor for time-division multiplexing said direct-sequence spread-spectrum signal with a pilot signal to generate a first time-division multiplexed pilot-aided direct-sequence spread-spectrum signal, which is partitioned into a series of time-slots; and
    a signal-inverter for inverting and alternately not-inverting said first time-division multiplexed pilot-aided direct-sequence spread-spectrum signal in accordance with a schedule to create a second time-division multiplexed pilot-aided direct-sequence spread-spectrum signal.

15. The apparatus of claim 14 further comprising:
    a first antenna for transmitting said first time-division multiplexed pilot-aided direct-sequence spread-spectrum signal; and
    a second antenna for transmitting said second time-division multiplexed pilot-aided direct-sequence spread-spectrum signal.

16. The apparatus of claim 14 wherein said first time-division multiplexed pilot-aided direct-sequence spread-spectrum signal comprises a succession of time-slots and said schedule inverts said first time-division multiplexed pilot-aided direct-sequence spread-spectrum signal during alternate time-slots.

17. A method comprising:
    receiving a time-division multiplexed pilot signal;
    time-division demultiplexing said time-division multiplexed pilot signal in accordance with a schedule to create an inverted information-bearing signal, an inverted pilot signal, a non-inverted information-bearing signal, and a non-inverted pilot signal;
    adjusting said inverted information-bearing signal based on said inverted pilot signal; and
    adjusting said non-inverted information-bearing signal based on said non-inverted pilot signal.

18. The method of claim 17 wherein said time-division multiplexed pilot signal is a time-division multiplexed pilot-aided direct-sequence spread-spectrum signal.

19. The method of claim 17 wherein said time-division multiplexed pilot signal comprises a succession of time-slots and said schedule sorts said time-division multiplexed pilot signal by alternate time-slots.

20. The method of claim 17 wherein said time-division multiplexed pilot signal comprises a succession of time-slots and said schedule sorts said time-division multiplexed pilot signal in accordance with a pseudo-noise sequence.

21. An apparatus comprising:
a receiver for a time-division multiplexed pilot signal;
a demultiplexor for time-division demultiplexing said time-division multiplexed pilot signal in accordance with a schedule to create an inverted information-bearing signal, an inverted pilot signal, a non-inverted information-bearing signal, and a non-inverted pilot signal;
a first multiplier for adjusting said inverted information-bearing signal based on said inverted pilot signal; and
a second multiplier for adjusting said non-inverted information-bearing signal based on said non-inverted pilot signal.

22. The apparatus of claim 21 wherein said time-division multiplexed pilot signal is a time-division multiplexed pilot-aided direct-sequence spread-spectrum signal.

23. The apparatus of claim 21 wherein said time-division multiplexed pilot signal comprises a succession of time-slots and said schedule sorts said time-division multiplexed pilot signal by alternate time-slots.

24. The apparatus of claim 21 wherein said time-division multiplexed pilot signal comprises a succession of time-slots and said schedule sorts said time-division multiplexed pilot signal in accordance with a pseudo-noise sequence.

25. A method comprising:
code-division demultiplexing an incoming signal to create a time-division multiplexed signal;
time-division demultiplexing said time-division multiplexed signal to create an information-bearing signal and a pilot signal, wherein said information-bearing signal comprises inverted information-bearing signals and non-inverted information-bearing signals and wherein said pilot signal comprises inverted pilot signals and non-inverted pilot signals;
adjusting said inverted information-bearing signals based on said inverted pilot signals; and
adjusting said non-inverted information-bearing signals based on said non-inverted pilot signals.

26. The method of claim 25 further comprising demultiplexing said inverted pilot signals from said non-inverted pilot signals.

27. The method of claim 26 wherein said step of demultiplexing is performed in accordance with a schedule.

28. The method of claim 26 further comprising:
filtering said inverted pilot signals; and
filtering said non-inverted pilot signals.

29. An apparatus comprising:
a receiver for receiving an incoming signal;
a time-division demultiplexor for time-division demultiplexing said time-division multiplexed signal to create an information-bearing signal and a pilot signal, wherein said information-bearing signal comprises inverted information-bearing signals and non-inverted information-bearing signals and wherein said pilot signal comprises inverted pilot signals and non-inverted pilot signals;
a multiplier for adjusting said inverted information-bearing signals based on said inverted pilot signals, and for adjusting said non-inverted information-bearing signals based on said non-inverted pilot signals.

30. The apparatus of claim 29 further comprising a demultiplexor for demultiplexing said inverted pilot signals from said non-inverted pilot signals.

31. The apparatus of claim 30 further comprising a scheduler for directing said demultiplexor in accordance with a schedule.

32. The apparatus of claim 30 further comprising:
a first filter for filtering said inverted pilot signals; and
a second filter for filtering said non-inverted pilot signals.

33. A method comprising:
code-division demultiplexing an incoming signal to create a time-division multiplexed signal and a pilot signal, wherein said information-bearing signal comprises inverted information-bearing signals and non-inverted information-bearing signals and wherein said pilot signal comprises inverted pilot signals and non-inverted pilot signals;
adjusting said inverted information-bearing signals based on said inverted pilot signals; and
adjusting said non-inverted information-bearing signals based on said non-inverted pilot signals.

34. The method of claim 33 further comprising demultiplexing said inverted pilot signals from said non-inverted pilot signals.

35. The method of claim 34 wherein said step of demultiplexing is performed in accordance with a schedule.

36. The method of claim 33 further comprising:
filtering said inverted pilot signals; and
filtering said non-inverted pilot signals.

37. An apparatus comprising:
a receiver for receiving an incoming signal;
a first multiplier for code-division demultiplexing said incoming signal to create an information-bearing signal, wherein said information-bearing signal comprises inverted information-bearing signals and non-inverted information-bearing signals;
a second multiplier for code-division demultiplexing said incoming signal to create a pilot signal, wherein said pilot signal comprises inverted pilot signals and non-inverted pilot signals; and
a multiplier for adjusting said inverted information-bearing signals based on said inverted pilot signals, and for adjusting said non-inverted information-bearing signals based on said non-inverted pilot signals.

38. The apparatus of claim 37 further comprising a demultiplexor for demultiplexing said inverted pilot signals from said non-inverted pilot signals.

39. The apparatus of claim 38 further comprising a scheduler for directing said demultiplexor in accordance with a schedule.

40. The apparatus of claim 37 further comprising:
a first filter for filtering said inverted pilot signals; and
a second filter for filtering said non-inverted pilot signals.

* * * * *